May 14, 1940. H. T. AVERY 2,200,588
CALCULATING MACHINE
Filed Oct. 25, 1926 14 Sheets-Sheet 1

Inventor:
Harold T. Avery

May 14, 1940. H. T. AVERY 2,200,588
CALCULATING MACHINE
Filed Oct. 25, 1926　　14 Sheets-Sheet 2
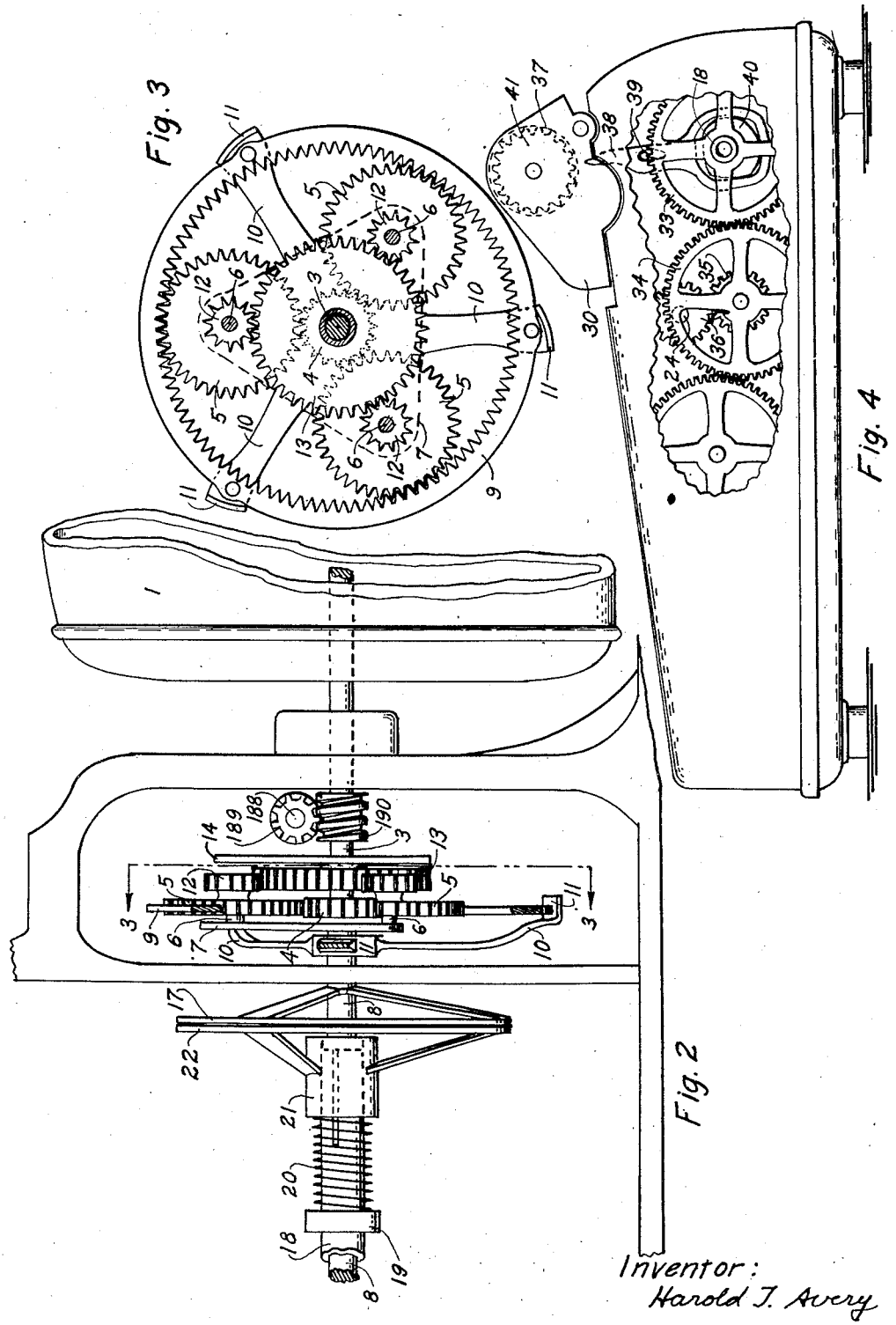
Inventor:
Harold T. Avery

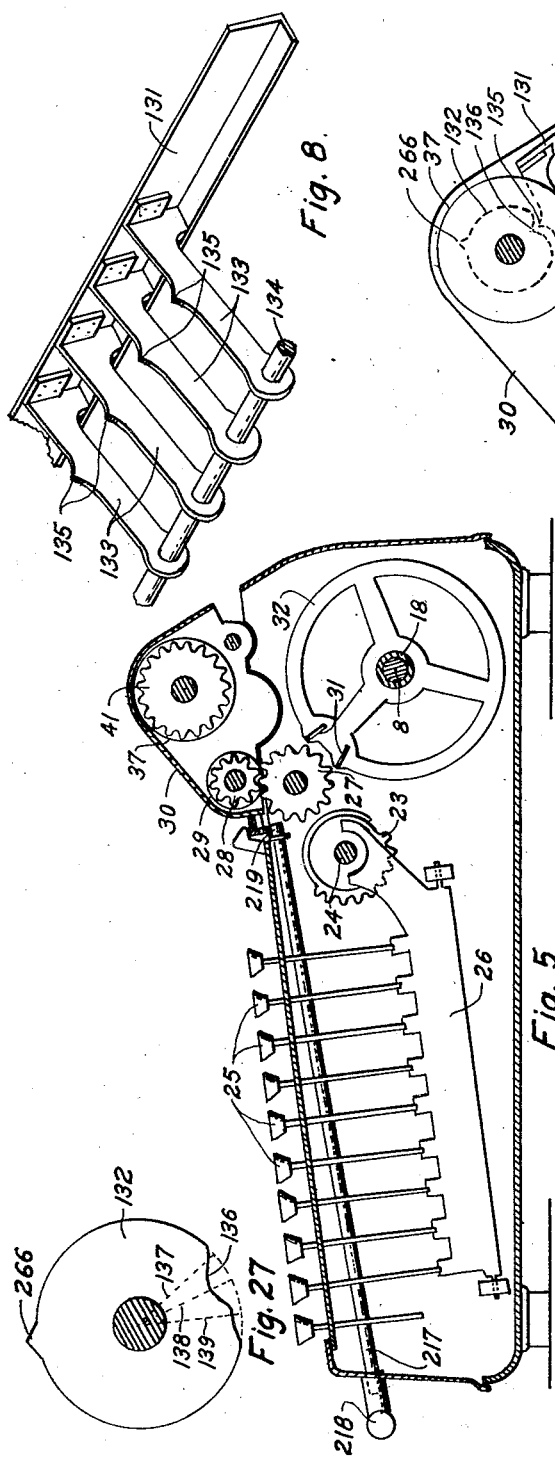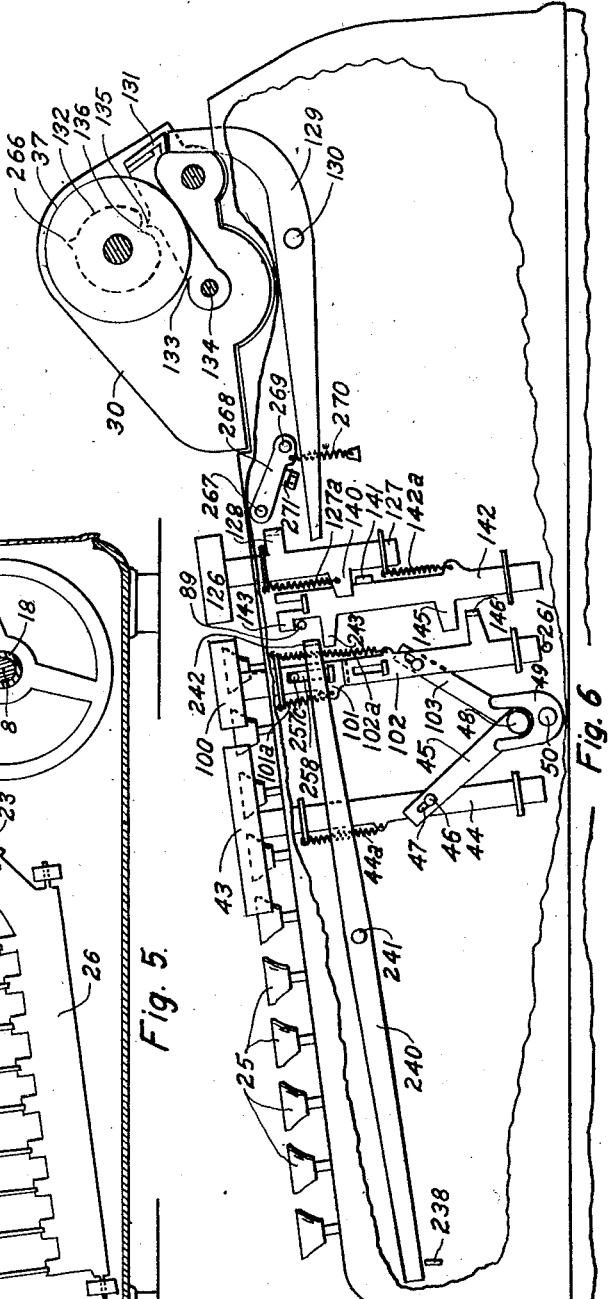

May 14, 1940.  H. T. AVERY  2,200,588
CALCULATING MACHINE
Filed Oct. 25, 1926  14 Sheets-Sheet 4
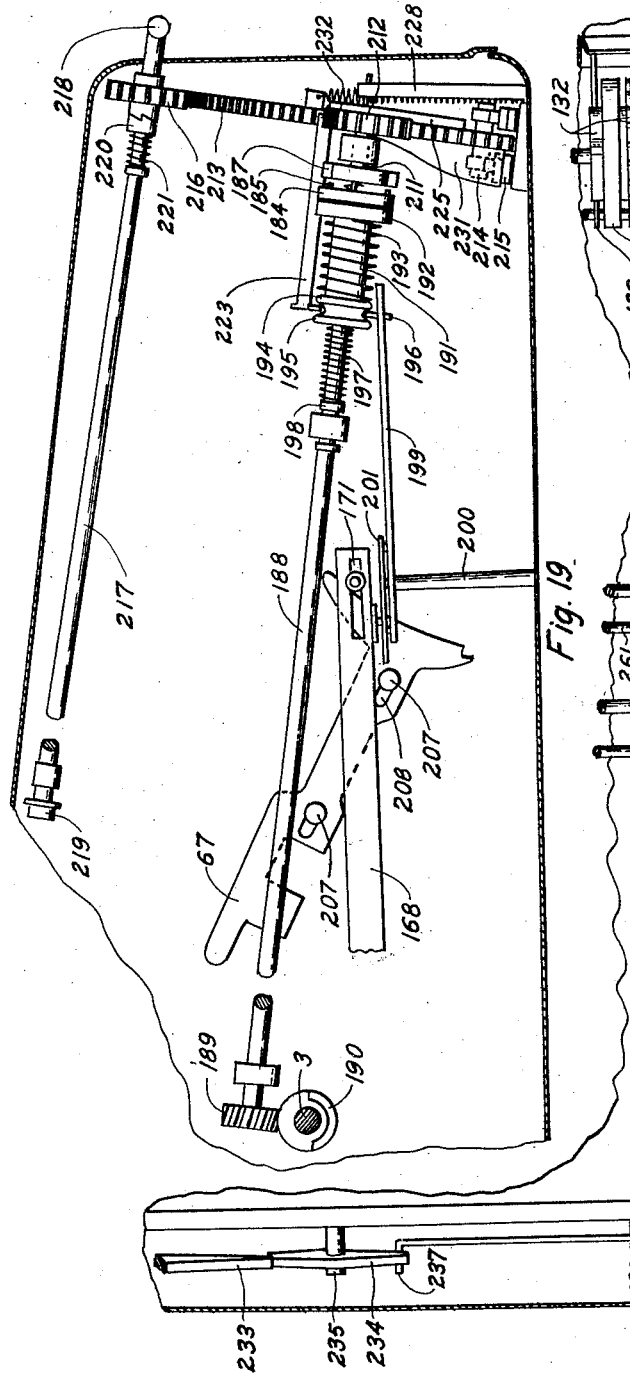
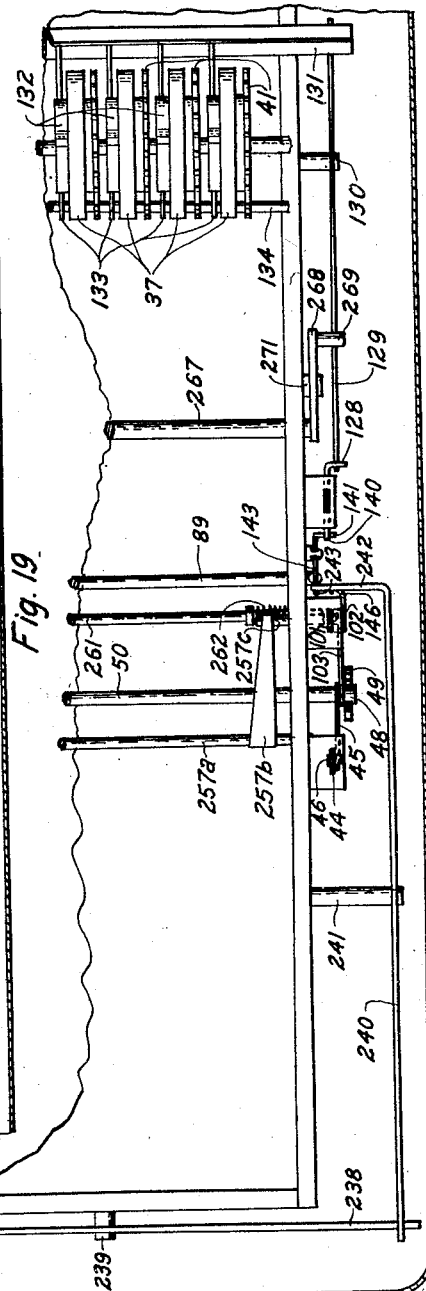
Inventor:
Harold T. Avery

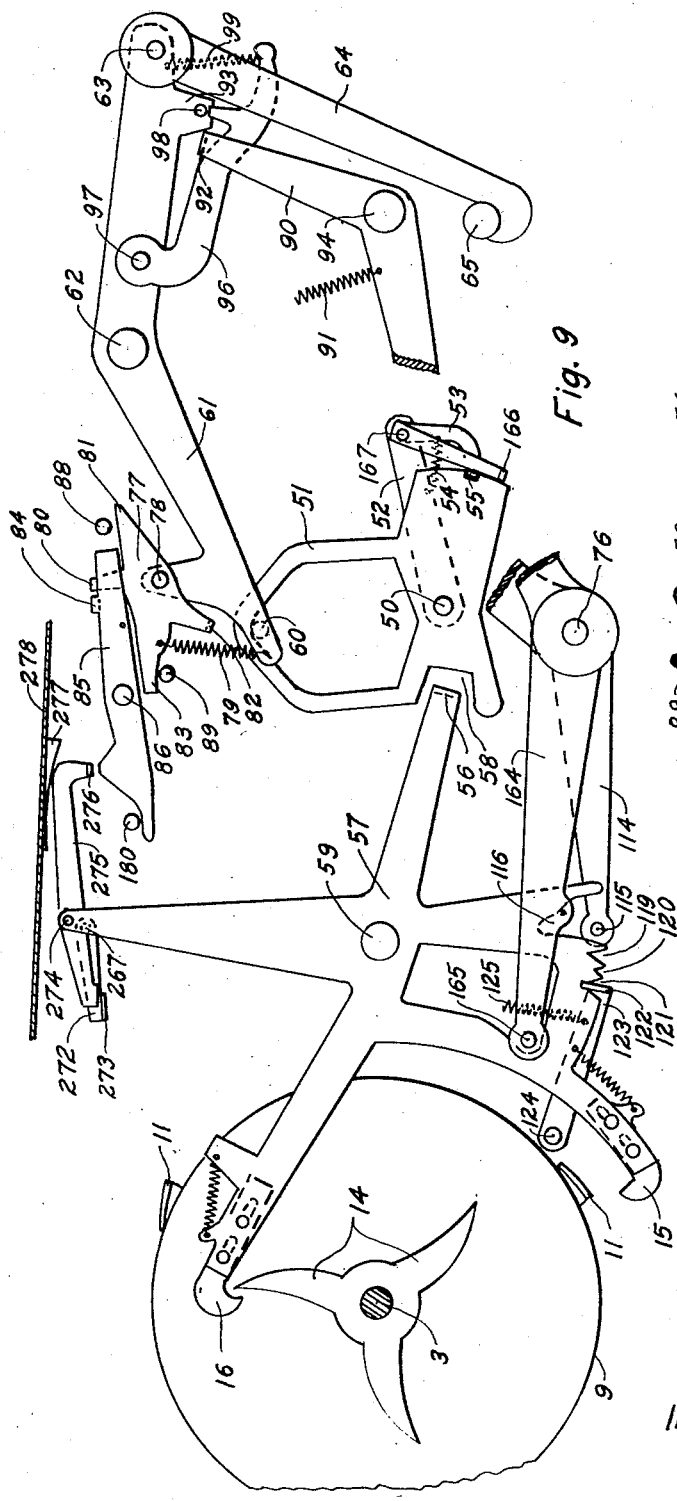
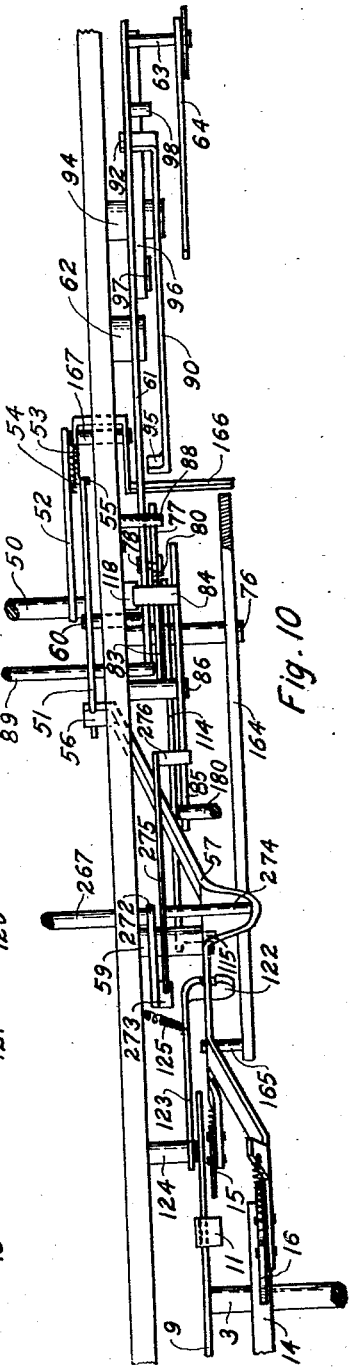
Fig. 9
Fig. 10

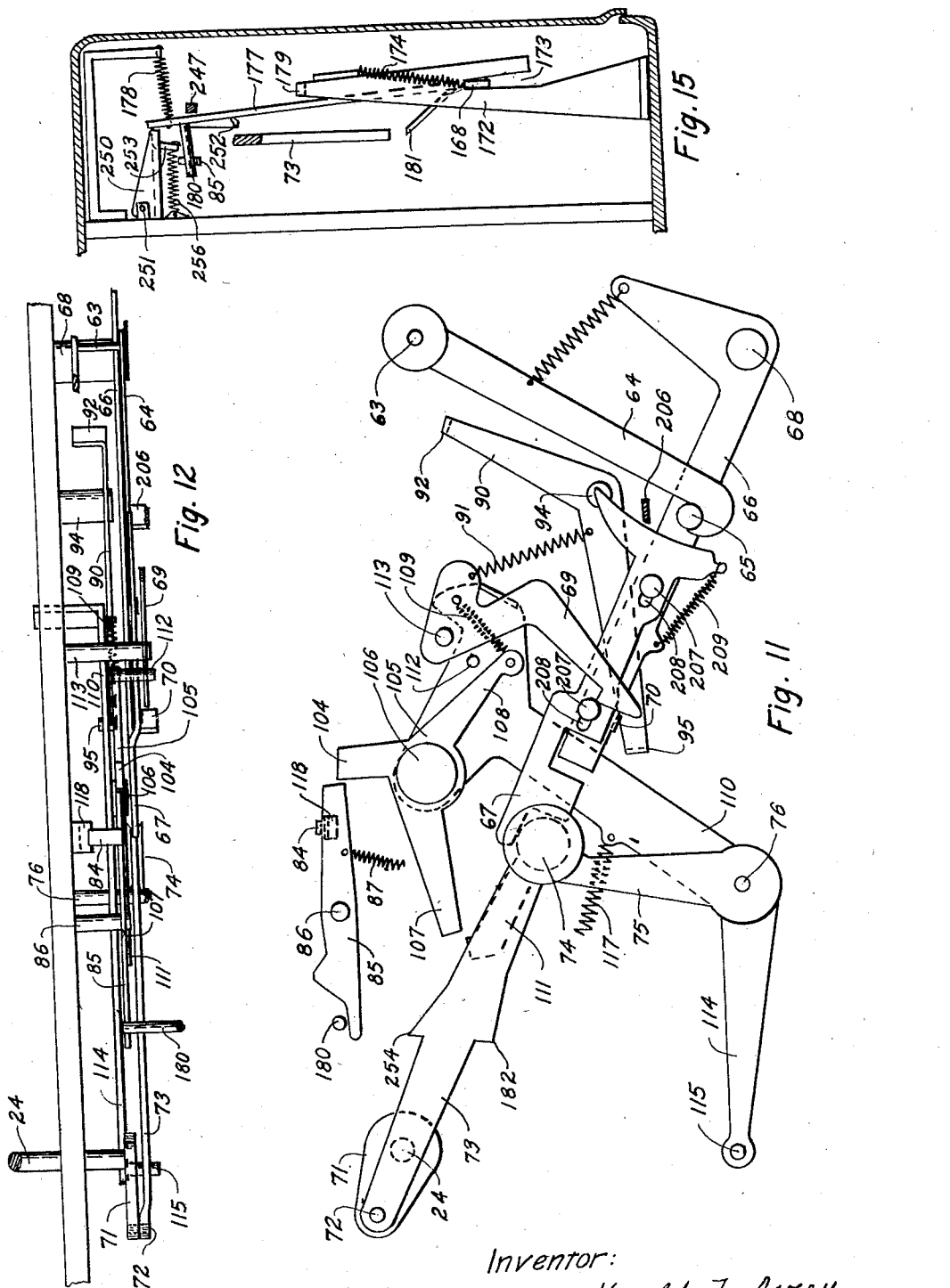

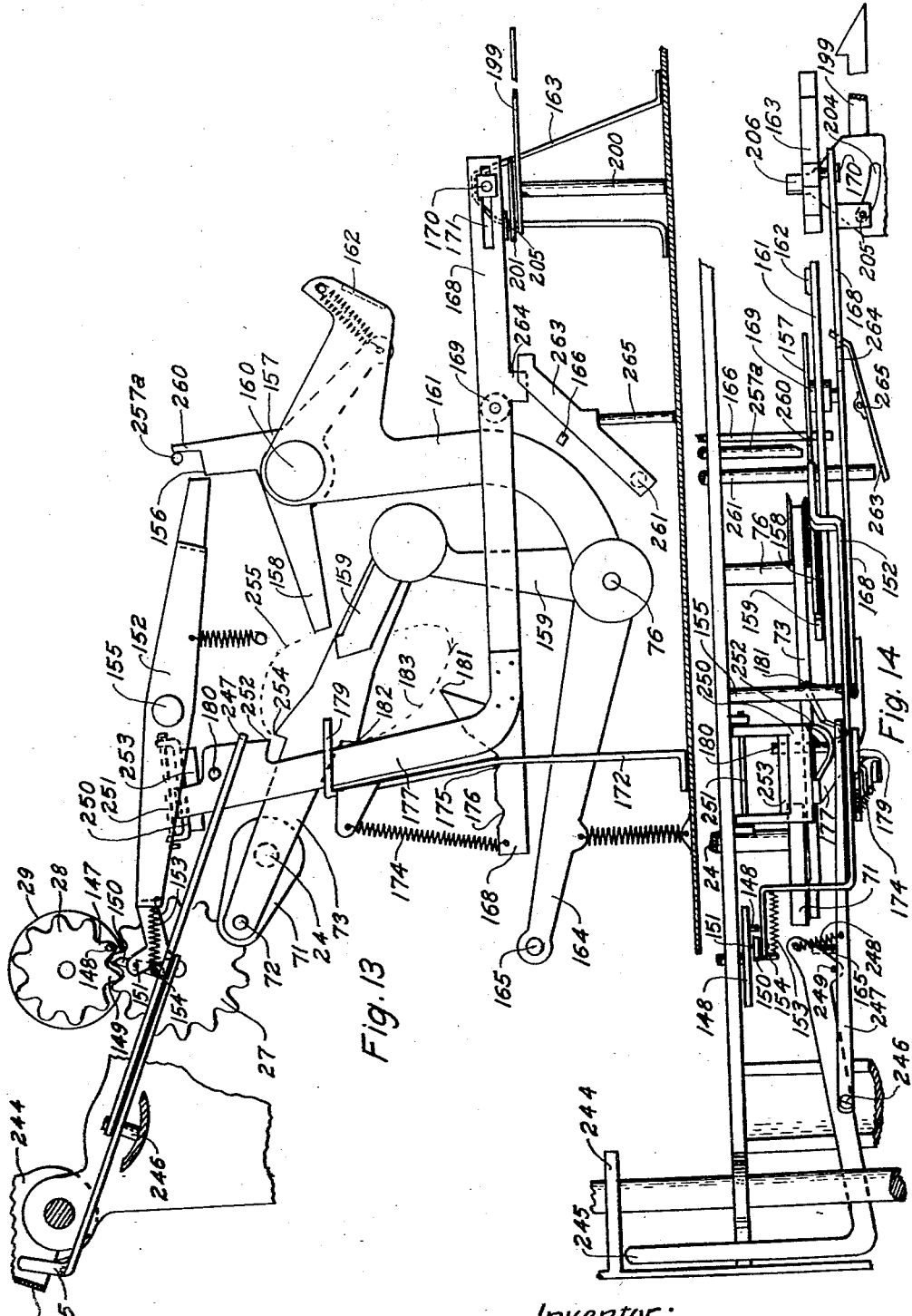

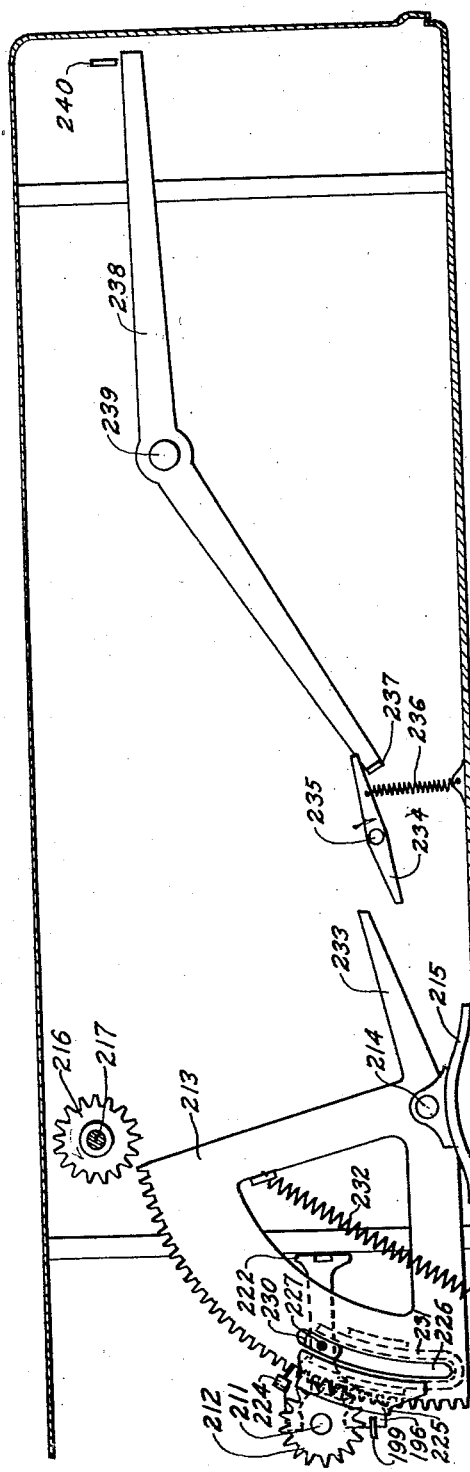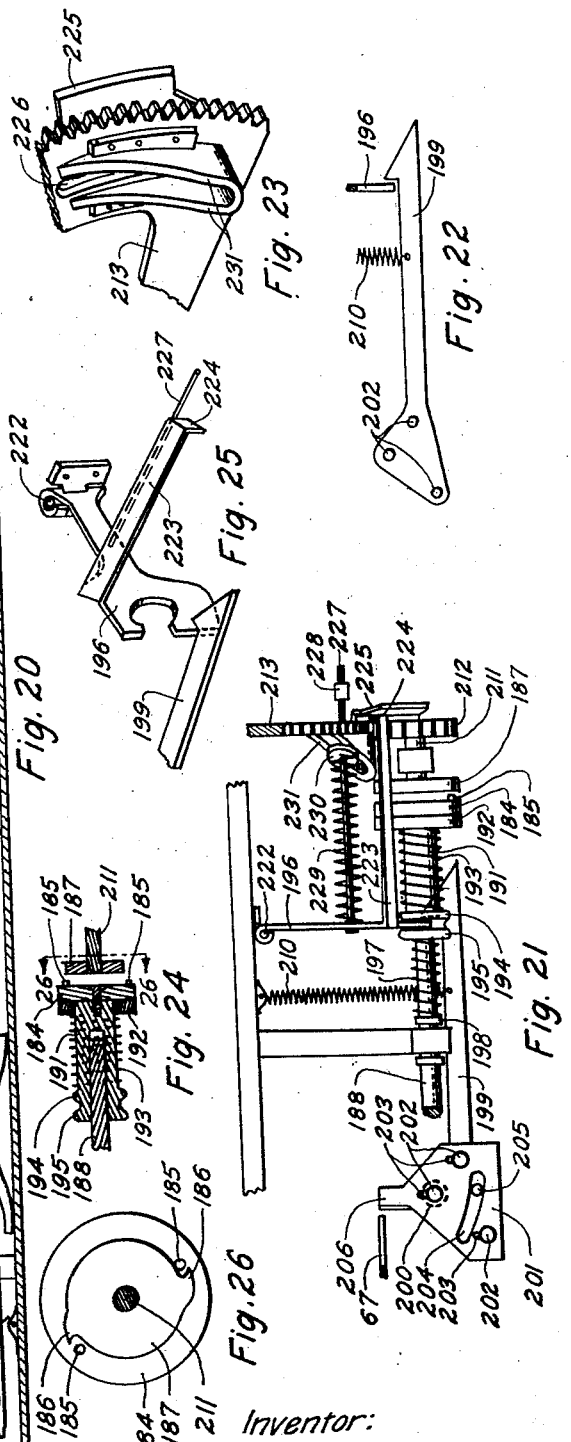

May 14, 1940.    H. T. AVERY    2,200,588
CALCULATING MACHINE
Filed Oct. 25, 1926    14 Sheets-Sheet 12

Inventor:
Harold T. Avery

May 14, 1940. H. T. AVERY 2,200,588
CALCULATING MACHINE
Filed Oct. 25, 1926 14 Sheets-Sheet 13

Inventor:
Harold T. Avery

Key 126 depressed

| Fig. 28 | Carriage in first column. |
| Fig. 29 | |
| Fig. 30 | Carriage shifted to second column. |
| Fig. 31 | |
| Fig. 29 | |
| Fig. 30 | Carriage shifted to third column. |
| Fig. 31 | |
| Fig. 29 | |

Operations of Figs. 31, 29, and 30 continued in rotation in each successive column until the carriage shift, which takes place during the sequence of operations shown in Fig. 30, brings carriage into last column.

| Fig. 30 | Carriage shifted into last column. |
| Fig. 31 | |
| Fig. 32 | Calculating operations stopped. |

Fig. 33

Inventor:
Harold T. Avery

Patented May 14, 1940

2,200,588

UNITED STATES PATENT OFFICE 2,200,588

CALCULATING MACHINE

Harold T. Avery, San Luis Obispo, Calif., assignor to Marchant Calculating Machine Company, a corporation of California Application October 25, 1926, Serial No. 144,034

40 Claims. (Cl. 235—63)

This invention relates to a calculating machine capable of automatically carrying out the process of division.

The objects of this invention are:

1. The provision of a calculating machine whereby the division of any number registered on the numeral wheels of the machine by any number set on the keyboard of the machine, will be automatically performed upon the depression of a "divide" key.

2. The provision in such a calculating machine of means whereby, if the quotient dials have been cleared previous to registering a dividend in the machine, they will be automatically cleared upon the depression of the divide key, thus eliminating the necessity of a separate clearing operation after registering the dividend.

3. The provision in such a calculating machine of means for automatically shifting the carriage carrying the dividend dials into the proper column for commencing the division if the divide key is depressed with the carriage too far to the right, and of means for stopping the division and indicating to the operator his error if the key is depressed with the carriage too far to the left.

4. The provision in such a calculating machine of means whereby the quotient of such a division as above mentioned will be registered in the quotient dials digit by digit beginning with the digit of the highest order and continuing until the correct digit is registered upon the lowest order quotient dial on the machine, and of means whereby the mechanical operations necessary to the accomplishment of division will thereupon be automatically stopped.

Other objects and advantages will hereinafter appear.

In addition to the above novel results, several constructional features of the invention will be apparent from the following specifications and claims. The invention consists in the novel construction and combination of parts as hereinafter set forth.

A preferred embodiment of the invention as applied to calculating machines of the general type and character described in United States Patent (Reissue) No. 13,841 is described in the following specification and illustrated in the accompanying drawings, while the broad scope of the invention is pointed out in the appended claims.

Throughout these specifications the "back" of the machine will be considered as that part furthest from the operator, namely the end along which the carriage is supported; the "front" that part nearest the operator; the "right" and "left," the sides to the operator's right and left respectively.

In the drawings:

Fig. 2 is a rear view of the mechanism which connects the motor by which the calculating machine is driven to the calculating mechanism, with certain portions of the mechanism broken away.

Fig. 3 is a vertical section of the same mechanism taken on the line 3—3 of Figure 2.

Fig. 4 is a right side view with the casing partly broken away, showing certain of the driving mechanism.

Fig. 5 is a vertical longitudinal section through the machine showing the registering mechanism.

Fig. 6 is a right side view showing particularly the mechanism of the control keys and of the automatic lock and clearing device in connection with the "divide" key.

Fig. 7 is a horizontal section and plan of the apparatus shown in Fig. 6 and a part of that shown in Fig. 20.

Fig. 8 is a perspective view of a portion of the connected bank of levers used to enable the "divide" key to automatically clear the quotient dials, it also serving to lock the "divide" key when automatic clearing is not possible.

Fig. 9 is a left side view of certain of the mechanism showing particularly the apparatus employed to set the registering mechanism into operation.

Fig. 10 is a plan of the mechanism shown in Fig. 9.

Fig. 11 is a left side view of certain of the mechanism showing particularly the apparatus employed to stop the registering mechanism.

Fig. 12 is a plan of the mechanism shown in Fig. 11.

Fig. 13 is a left side view of certain of the mechanism showing particularly the apparatus employed in connection with division to reverse the direction of the registering mechanism, to stop the registering mechanism, to control the engaging of the shift mechanism, and to stop all calculating operations, all at the proper stages of the division.

Fig. 14 is a plan of the mechanism shown in Fig. 13.

Fig. 15 is a rear elevation of certain of the mechanism shown in Fig. 13.

Fig. 19 is a left side view of the mechanism for automatically shifting the carriage.

Fig. 20 is a front elevation of the shift mechanism and of the mechanism for again starting the registering mechanism upon the completion of a shift.

Fig. 21 is a plan of a portion of the shift mechanism.

Fig. 22 is a plan of the hook which retains the shift mechanism and prevents it from engaging and operating except when tripped.

Fig. 23 is a perspective view (looking downwardly from the left rear) of a portion of the geared segment utilized in the shift mechanism, showing particularly the inclined surfaces attached to the segment for compressing the spring which disengages the shift mechanism.

Fig. 24 is a longitudinal section of the shift engaging mechanism.

Fig. 25 is a perspective view (looking downwardly from the left front) of the shifting fork which controls the mechanism shown in Fig. 24, also showing a portion of the hook shown in Fig. 22.

Fig. 26 is a cross-section on line 26—26 of Fig. 24.

Fig. 27 is a side view of a notched and toothed disc such as is attached to each counting dial.

Figure 28:
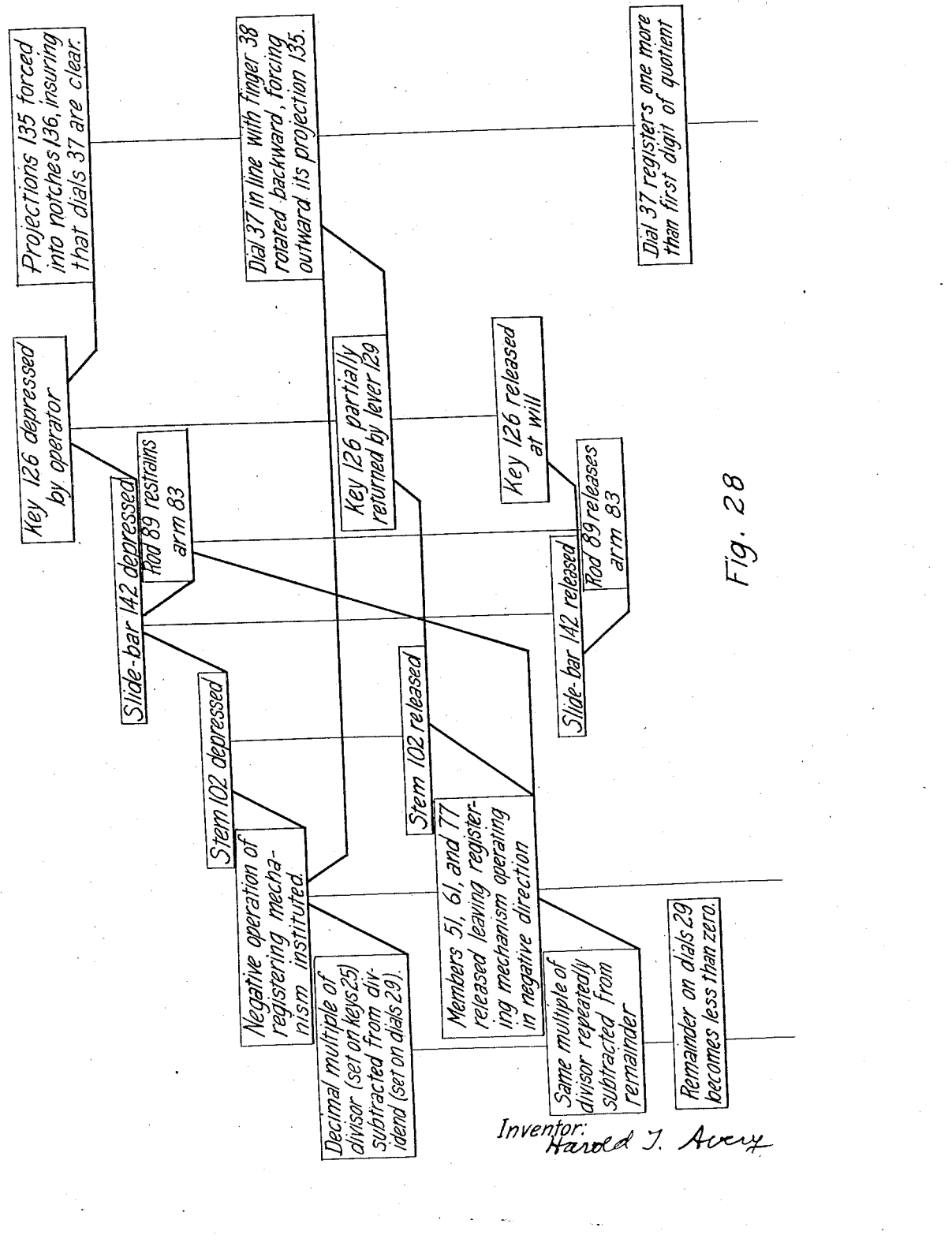

Fig. 28 shows diagrammatically the sequence of the principal operations incident to the starting of a division calculation. In this figure the time sequence runs from the top of the figure downward, the horizontal line beneath the description of an operation indicating its relative position. Successive operations relating to the same mechanism are connected by vertical lines, and where the operations pertaining to a given mechanism are not completed within the figure, the vertical lines extend to the bottom of the figure to indicate continuance in the next succeeding figure. The relation of cause and effect is indicated by diagonal lines, a line being drawn diagonally downward from the horizontal line beneath each operation to the horizontal line beneath each of the operations directly resulting therefrom.

Figure 29:
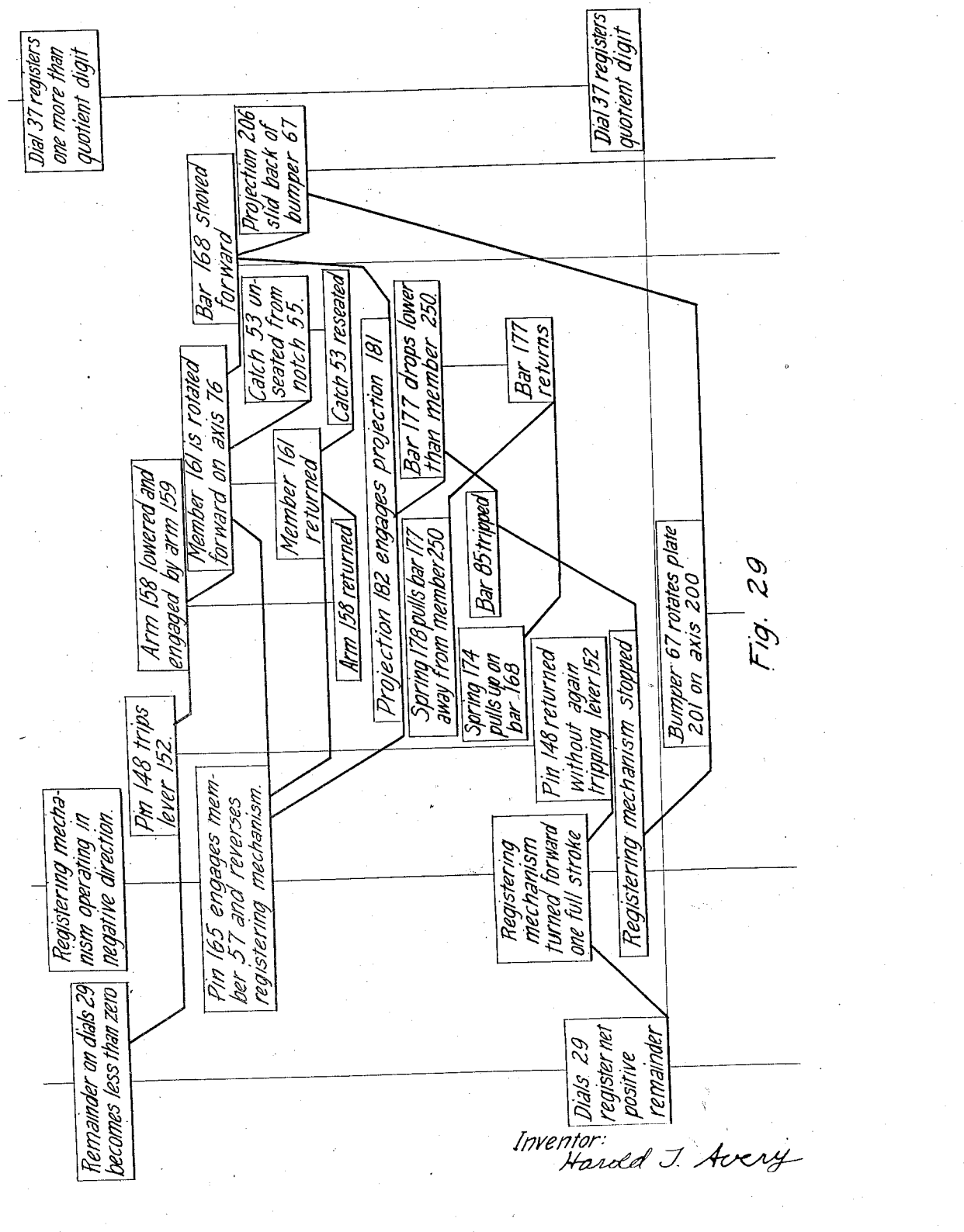

Fig. 29 is a similar diagram of the principal operations incident to the reversal and stopping of the registering mechanism at the completion of substraction in a given column. The operations shown in Fig. 29 consecutively follow those shown in Fig. 28, and it will be noted that the positions and conditions of operation indicated as pertaining at the close of operations in Fig. 28 are repeated at the top of Fig. 29, and that vertical lines extend to the top of Fig. 29 for each group of mechanism for which lines extended to the bottom of Fig. 28. The continuity of action from one figure to the other is thus made readily evident.

Figure 30:
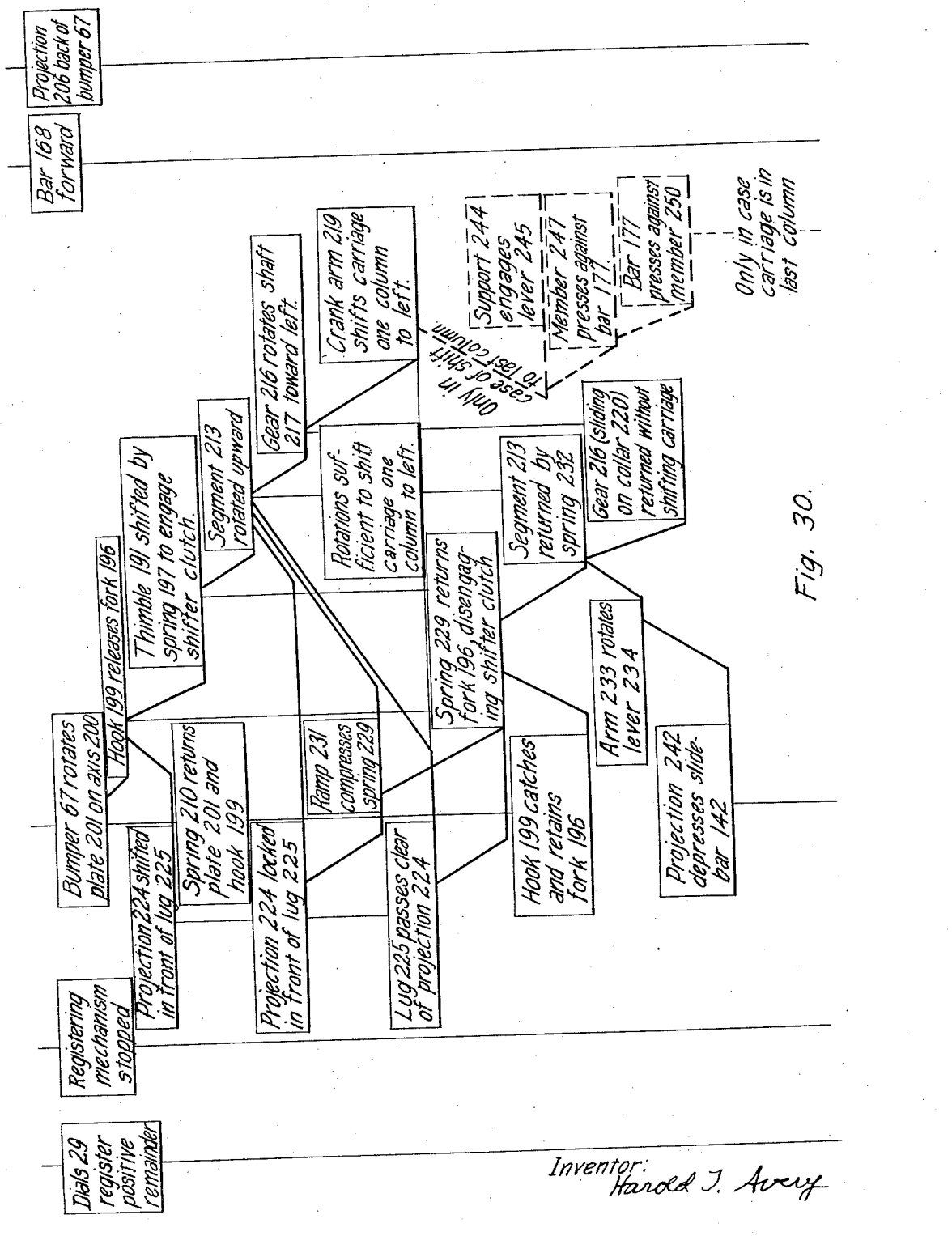

Fig. 30 is a similar diagram of the principal operations incident to the shifting of the carriage. These operations follow those shown in Fig. 29, just as those shown in Fig. 29 follow those of Fig. 28, and the action common to the two figures is similarly repeated, and indicated by vertical lines extending to the limits of the figures.

Figure 31:
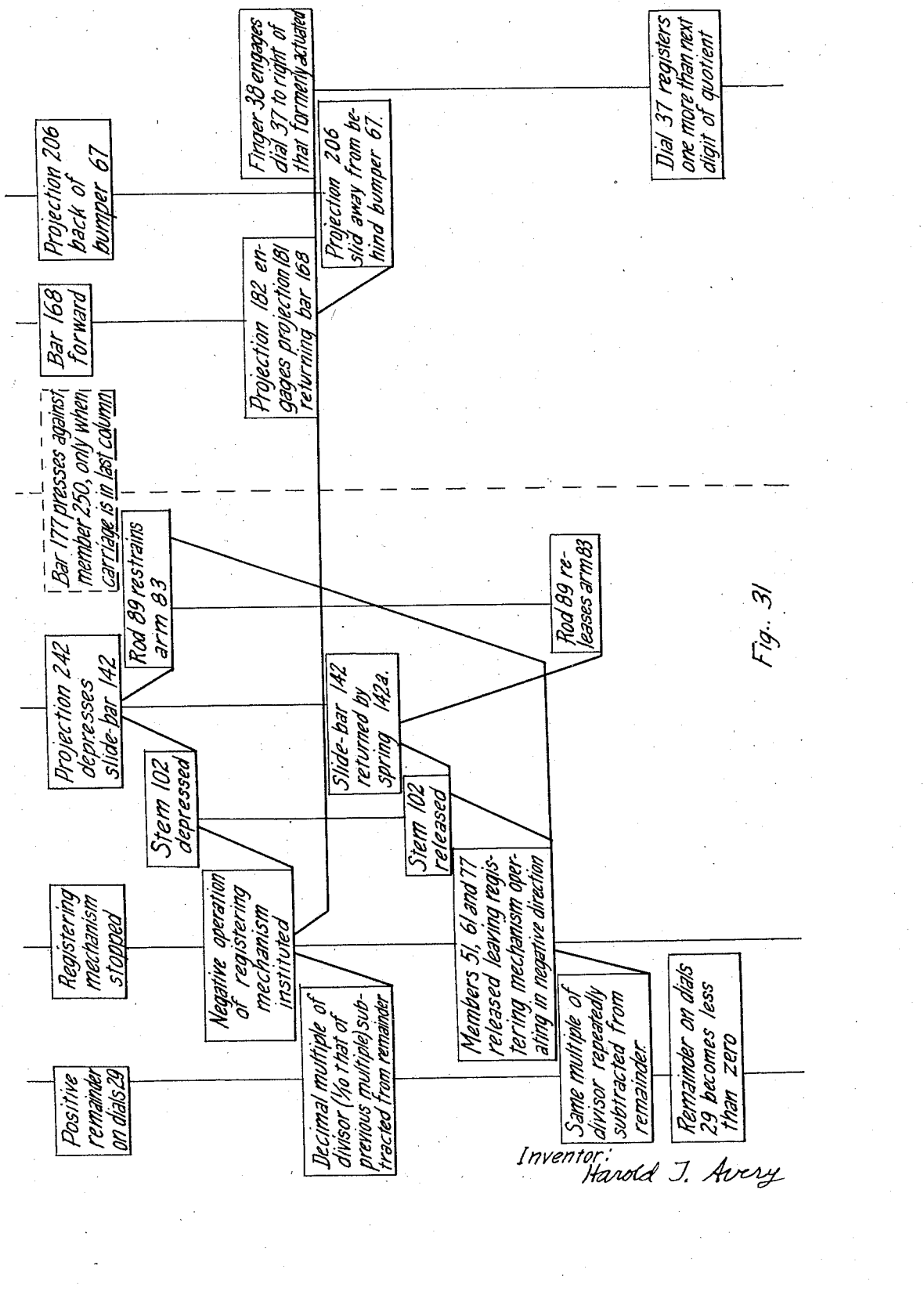

Fig. 31 is a similar diagram of the principal operations incident to subtraction in the next successive column, and is similarly connected to Fig. 30 which it follows in sequence. It will be noted that this figure covers operations generally similar to those shown in Fig. 28, but differing in certain particulars, and that the final operations indicated at the bottom of the figure are identical with the similar ones of Fig. 28.

Figure 32:
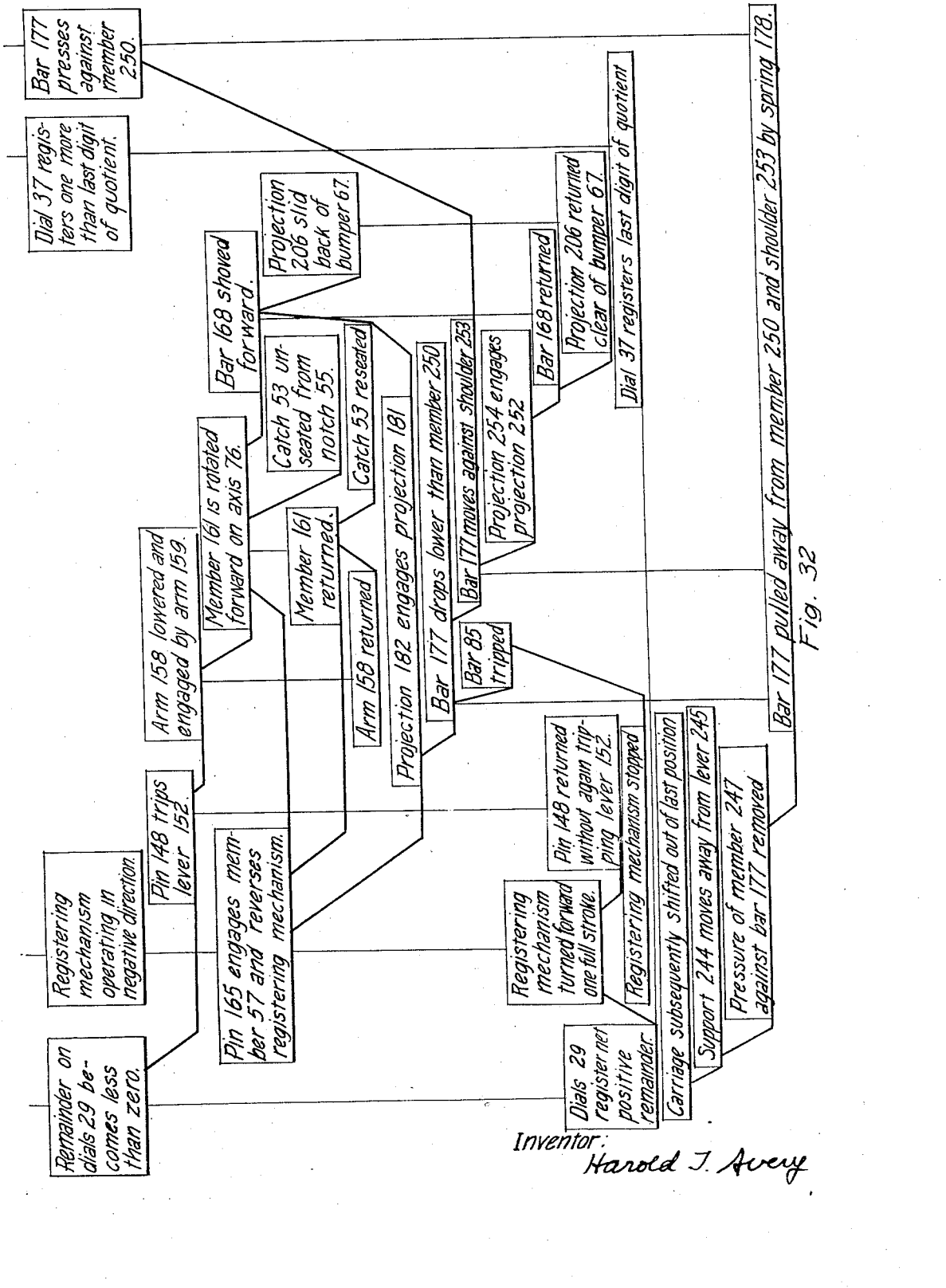

Fig. 32 is a similar diagram of the principal operations incident to the reversal and stopping of the registering mechanism in the last column.

Fig. 33 indicates diagrammatically the relative sequence of the respective operations indicated in Figs. 28 to 32, inclusive, the time sequence being from the top of the figure downward.

A. ELECTROMOTIVE DRIVE MECHANISM

The electromotive drive mechanism, which I utilize in my preferred embodiment and describe below, is substantially the same as that described in United States Patent No. 1,566,650, issued to G. C. Chase, and reference is hereby made to said patent.

In the accompanying drawings, illustrating an embodiment of the invention, the numeral 1 represents the electric motor which, in the manner hereinafter described, drives the calculating mechanism. Whenever electric switch 2 is turned on, the shaft 3 of the motor revolves in a counter-clockwise direction as viewed from the left. The switch is assumed to be thus turned on throughout the calculating operations hereinafter described.

Fastened to the right end of shaft 3 is a pinion 4 which meshes with three planetary gears 5, which are mounted respectively on three shafts 6, these shafts being firmly fastened to a plate 7, which is attached to the end of shaft 8. Planetary gears 5 mesh with teeth on the inner face of ring 9 as shown in Fig. 3. Ring 9 is supported and guided by three radial arms 10 to which it is firmly fastened, the inner ends of arms 10 being rigid with mounting 11, which rotates freely upon shaft 8. The outer end of each arm 10 is folded over to form a projection 11, by means of which the rotation of ring 9 may be arrested as hereinafter described.

Firmly attached to each planetary gear 5 so as to revolve and rotate with it, is a smaller gear 12. These gears 12 mesh into a gear 13 which rotates freely upon shaft 3, and has firmly attached to it a three-armed member 14 (see Figs. 2 and 9), by means of which its rotation may be arrested as hereinafter described.

The arrangement of gears as above described, and as illustrated in Figs. 2 and 3, is such that if ring 9 and gear 13 are both free to turn, the rotation of pinion 4 does not cause shaft 8 to rotate. This shaft remaining stationary, holds stationary plate 7 and shafts 6. Each planetary gear 5 rotates upon its shaft 6, the counter-clockwise rotation of pinion 4 causing a clockwise rotation of ring 9 and a counter-clockwise rotation of gear 13.

If a catch 15 (Fig. 9) is placed in a position to catch and hold projection 11 and thus prevent ring 9 from rotating in its clockwise direction, the counter-clockwise rotation of pinion 4 will cause planetary gears 5 to revolve in a counter-clockwise direction. These will in turn revolve shafts 6, plate 7, and shaft 8 in the same direction.

If instead of ring 9 being restrained, a catch 16 (Fig. 9) is placed so as to catch and hold an arm of 14 and thus prevent gear 13 from rotating, the counter-clockwise rotation of pinion 4, causing a clockwise rotation of gears 5 and 12, will cause gears 12 to revolve in a clockwise direction about gear 13, thus revolving shafts 6, plate 7, and shaft 8 in a clockwise direction.

In order to provide the necessary flexibility and avoid the probability of damage if some object should become jammed in the calculating mechanism, shaft 8 is not rigidly connected to the calculating mechanism, but instead supports a ring 17 in such a manner as to always rotate with it. A sleeve 18 mounted upon shaft 8 is rigidly connected with and geared to the calculating mechanism in the manner hereinafter described. On sleeve 18 is rigidly mounted a collar 19, against which a spiral spring 20 presses, thereby shoving mounting 21 to the right as viewed in Fig. 2 and pressing ring 22 which is supported from mounting 21 against ring 17 above mentioned. Mounting 21 is keyed to sleeve 18 so that although it may slide along the sleeve, the two must rotate together. The friction between rings 22 and 17 therefore causes sleeve 18 to rotate in unison with shaft 8, except in the case of some unusual resistance, great enough to cause the rigs to slide upon each other.

B. Registering and Counting Mechanism

The registering mechanism of this calculating machine is substantially the same as that covered by Reissue Patent No. 13,841 above mentioned, as revised by United States Patent No. 1,474,230. This mechanism is clearly illustrated and described in said patents and reference is made to them for details of this portion of the mechanism. Briefly, it consists of a number of selecting or primary gears 23 (Fig. 5), mounted upon, keyed to, and longitudinally slidable upon shaft 24. These gears 23 are aranged in sets of two, each set selectively positioned by a series of digital keys 25 and connecting rock bars 26, so that whenever a digital key is depressed in any column as many teeth on selecting gears 23 line up with the intermediate gear 27 of that column as the numerical value of the key depressed. Each intermediate gear 27 meshes with a gear 28 attached to a numeral wheel 29 in the transversely shiftable carriage 30, the particular gear 28 engaged and numeral wheel operated depending upon the lateral position of the carriage. Carrying is accomplished by means of laterally movable carrying teeth 31 supported on annuli 32 which are rigidly attached to sleeve 18. Shaft 24 and sleeve 18 are arranged to rotate equally in the same direction by means of the gears shown in Fig. 4, gear 33 fast upon sleeve 18 meshing with an equal gear 34 to which is firmly attached a smaller gear 35 meshing with an equal gear 36 fast upon shaft 24.

Thus each revolution of shaft 24 and sleeve 18 registers on the numeral wheel lined with any key that is depressed the value of the depressed key and completes the addition or subtraction of the value depressed including any carrying involved. Registering is positive when shaft 24 rotates in a clockwise direction as viewed from the right (counterclockwise as viewed from the left), and negative when in the opposite direction.

Figure 1:
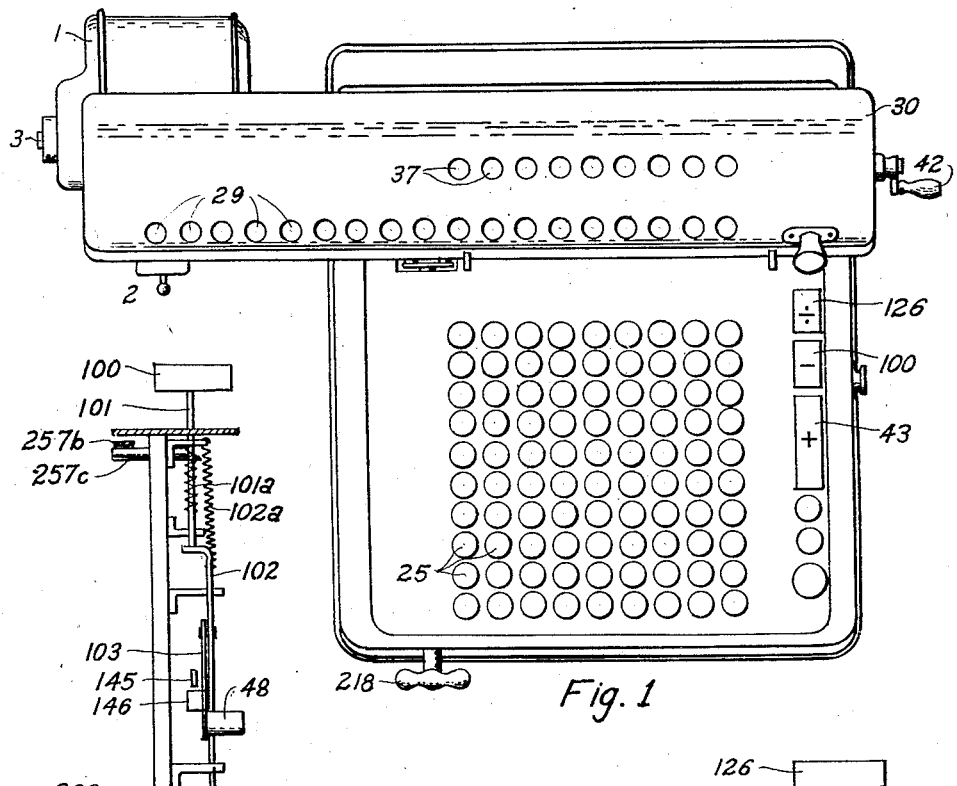
Fig. 1 is a top plan view of the calculating machine.

The number of times that the registering mechanism has revolved in each position of the carriage since the last clearing of the counting dials 37 is registered on said counting dials by means of counting finger 38, which in each position of the carriage engages, during the rotation of sleeve 18, one gear 41 fast to a counting dial 37. Counting finger 38 is slotted to slide approximately vertically upon pin 39. The lower end of the finger is given a circular motion by cam 40 fast on sleeve 18. The direction of the circular component of the motion of the various portions of the counting finger is, of course, opposite on opposite sides of pin 39. The upper end of finger 38 thus engages gear 41 and moves it one notch each revolution, in the direction of rotation of sleeve 18. Gear 41 has nineteen teeth and numeral wheel 37 is numbered from 0 to 9 in opposite directions, the numbers increasing in the direction in which they are successively exposed during positive rotation being black, and the other series red. All counting dials 37 may be cleared so as to register "0" by a revolution of crank 42 (Fig. 1) in one direction and all numeral wheels 29 similarly cleared by a revolution of the same crank in the opposite direction.

C. Plus and Minus Operating Mechanism

When it is desired to register any number in the machine in a positive direction, the number is first set up on the keyboard by depressing the proper digital keys 25, and then "plus" key 43 is depressed. This key has an approximately vertical stem 44 (Figs. 6 and 7), which is normally held up by spring 44a, and to which is attached a bar 45 by means of pin 46 which passes through a short slot 47 in bar 45. Near the lower end of said bar is attached a short horizontal roller or pin 48 which rests in the slot of cradle 49, which in turn is fast to shaft 50. The depressing of key 43 presses on bar 45 through pin 46 and thereby rocks cradle 49 and shaft 50 in a clockwise direction as viewed from the right.

Near the opposite end of shaft 50 member 51 (Figs. 9 and 10) is rotatably mounted, and is made to rotate with shaft 50 except under special circumstances (as explained in Section E—4 of these specifications) by means of arm 52 (which is fast to shaft 50) and catch 53 which is held by spring 54 into notch 55 of member 51.

Projection 56 on the end of member 57 extends into notch 58 on member 51 in such a manner that when member 51 is rotated any considerable distance in either direction it will rotate member 57 in the opposite direction on stationary shaft 59 on which it is mounted. When the "plus" key is depressed member 51 is rotated in a counter-clockwise direction as viewed in Fig. 9 and therefore rotates member 57 in a clockwise direction, thereby bringing catch 15 up to where it engages a projection 11 and stops the rotation of ring 9 which in the manner previously described starts the registering mechanism rotating in the positive direction.

Before member 51 has rotated sufficiently to bring about the results just mentioned it has depressed pin 60 which extends under the slanting upper portion of member 51, and has thereby depressed the end of bar 61 to which pin 60 is attached, thus rotating it on its fixed axis 62 and raising pin 63 and arm 64 at the opposite end of the bar. The hook at the lower end of arm 64 raises pin 65 thus raising bar 66 (Fig. 11) (at the rear end of which is bumper 67) on its fixed axis 68. When this is done hook 69, under the tension of spring 91, catches projection 70 on bar 66 thus retaining the bar in its raised position.

The reason for raising this lever before starting the registering mechanism is as follows:

Rigidly attached to the left end of shaft 24 is a crank 71 (Figs. 11 and 12) which necessarily rotates whenever the registering mechanism operates. This crank is attached near its outer end by a pin 72 to connecting-rod 73 the opposite end of which is attached by a pin 74 to arm

75. Each revolution of the registering mechanism therefore causes arm 75 to rotate back and forth through a considerable arc on its fixed axis 76. It can only do this when bumper 67 is raised from behind pin 74, and it is therefore only under this condition that the registering mechanism can operate.

Attached to bar 61, near the end of said bar that is lowered by the depressing of the operating key, is a trip 77 (Fig. 9). This trip is rotatably attached to bar 61 by pin 78 and is pulled in a counter-clockwise direction as viewed in Fig. 9 by spring 79, but the tendency for it to thus rotate is normally resisted by the pressure of arm 80 of the trip against projection 84 of trip-bar 85. When the operating key is depressed however, the end of arm 61 is lowered sufficiently to lower arm 80 below projection 84, and it snaps past the projection, its rotation then being stopped by the pressure of the projection on the end of arm 82 against bar 61. Arm 83 passes freely past the end of bar 89 except when the "divide" key is depressed as hereinafter explained.

So long as key 43 is held down, the pressure of member 51 against pin 60 will continue to depress the end of bar 61 and keep arm 80 below projection 84, and the registering mechanism will continue to repeatedly register the value punched on the digital keys, adding it anew to the total on the numeral wheels on each revolution of shaft 24. When key 43 is released, however, shaft 50, member 51, and bar 61 return to their normal positions, arm 80 raising projection 84 in the process, and thereby stopping the registering mechanism as hereinafter explained. As trip 77 is raised it is rotated back to its original position by the pressure of arm 81 against fixed pin 88.

In order that the return of arm 61 may take place during the proper part of the revolution of the registering mechanism, rock bar 90 is rotated by spring 91 so that projection 92 on the upper end of the bar will drop under projection 93 on bar 61 and prevent the return of that bar. Near the middle of the revolution, however, rock bar 90 is rotated upon its fixed axis 94 (in a counter-clockwise direction as viewed in Fig. 11) by the pressure of arm 75 against projection 95 at the lower end of the bar. This causes projection 92 to slide out from under projection 93 and engage bar 96 which is pivotally mounted on bar 61 by pin 97 and held against pin 98 on said bar by spring 99. This tends to rotate bar 96 on pin 97 and distend spring 99. If pin 60 is still held down due to the operating key still being depressed spring 99 distends and bar 61 remains unmoved, but if the operating key has been released the rotation of rock bar 90 renders the tension of spring 99 available to aid in the return of bar 61 to its original position. Rock bar 90 thus determines that the return of bar 61 and tripping of bar 85 will take place as soon after the "plus" or "minus" key is released as the proper portion of the cycle for such return is reached.

Figure 17:
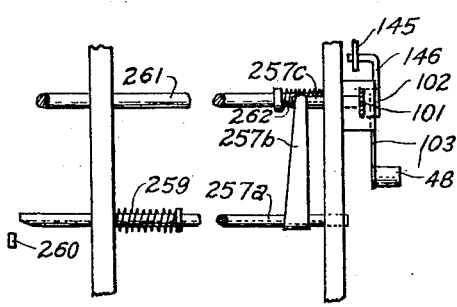
Fig. 17 is a similar view of the minus key.

When the "minus" key 100 is depressed the upper portion of the stem 101 (which is normally held up by spring 101*a*) presses upon and lowers the independently moveable lower portion of the stem 102 (Fig. 17), which is normally held up by spring 102*a*. This causes a pressure on roller 48 through bar 103 (Fig. 6) similar to that exerted through bar 45 when key 43 is depressed, but such that shaft 50 is forced to rotate in the opposite direction. This rotates members 51 and 57 in directions opposite to those formerly described, and instead of catch 15 engaging projection 11, catch 16 engages arm 14, and as heretofore described starts the registering mechanism revolving in the negative direction. Pin 60 will be lowered in exactly the same manner by the rotation of member 51 in either direction from neutral, so that the action of all parts controlled through it, including bumper 67 and trip 77 will be exactly as previously described in connection with the depression of the "plus" key.

D. STOPPING OF REGISTERING MECHANISM

As previously outlined, as soon after the release of the "plus" or "minus" key as the proper portion of the cycle is reached, projection 84 on trip-bar 85 is raised by arm 80 of trip 77 (Fig. 9). This rotates bar 85 on its fixed axis 86 and raises the end of the bar sufficiently to allow arm 104 to slide beneath it (see Fig. 11). Arm 104 is a portion of member 105 which is pivotally mounted on member 110 by means of pin 106. Spring 109 attached to arm 108 rotates member 105 in a counter-clockwise direction as viewed in Fig. 11. This lowers arm 107 of member 105 so that at the start of the next succeeding revolution it is engaged by arm 111 which is rigid with arm 75.

Member 110, like arm 75—111, rotates on the fixed axis 76. Therefore when arm 107 is engaged by arm 111 the entire group of members 75, 111, 107, 105, 106, and 110 rotate as one unit on axis 76 and are shoved to the right, as viewed in Fig. 11, by connecting-rod 73 which in turn is being forced over by the revolution of crank 71.

As it moves to the right, pin 112 mounted on member 110 presses against the side of hook 69 and rotates it on its fixed axis 113 so as to release projection 70 from the hook and let bumper 67 fall upon connecting-rod 73, ready to drop in behind it the next time the rod returns to its extreme left position, which it assumes when the registering mechanism is in neutral. Meanwhile arm 114 which is rigid with member 110 rotates with said member, thus raising pin 115 which is mounted on it, into slot 116 on member 57 (see Fig. 9). The slot is so shaped that at the lower end it is broad enough to allow the rotation of member 57 into either its positive or negative positions, but it gradually converges so that at the upper end it is only broad enough to receive pin 115, and the pin moving into this position rotates member 57 out of either its positive or negative position into the neutral position in which neither hooks 15 or 16 engage projections or arms. Thus the rotation of the registering mechanism is stopped, and the entire mechanism returns under the tension of spring 117 (Fig. 11) to the neutral position.

As soon as arm 104 slid out from under trip bar 85, in the rotation of the group of members that brought about the stopping of the registering mechanism in the manner above described, bar 85 returned under the tension of spring 87 to rest upon bracket 118, and when member 110 returns to its normal position arm 104 catches against trip-bar 85, thus raising arm 107 so that arm 111 may pass freely beneath it until bar 85 is again tripped.

In order that member 57 may be retained definitely in either its positive, negative, or neutral positions, and to facilitate it in passing quickly into a full positive or negative position if moved partially into either one, three notches 119, 120, and 121 (Fig. 9) are placed in the lower side of member 57, and projection 122 on the end of arm 123, which is pivotally attached to fixed axis 124 is arranged to slide into these notches under the tension of spring 125.

E. DIVISION

1. General method

Automatic division on this calculating machine is performed by successively subtracting decimal multiples of the divisor from the dividend as many times as each multiple can be subtracted and leave a positive remainder, the operation beginning with the largest decimal multiple which can be subtracted. The quotient is the record of the number of subtractions of each such multiple.

To thus perform a division the numeral wheels 29 and counting dials 37 are first cleared, if not already so, by the use of clearing crank 42. The dividend is then registered on the keyboard by the depression of the proper digital keys 25, and carriage 30 set so that the desired position of the decimal place on the row of numeral wheels will line with the decimal place on the keyboard. "Plus" key 43 is then depressed for an instant thus registering the dividend on numeral wheels 29, and registering a black (positive) "1" on the counting dial operative at the carriage position used. The divisor is then set up on the keyboard by the depression of the proper digital keys 25, and the carriage set in the furthest position to the right in which the divisor can be subtracted from the dividend with a positive remainder (this is equivalent to giving the divisor a value in relation to the dividend equal to the highest decimal multiple of the divisor subtractable from the dividend). The "divide" key 126 is then depressed which, as hereinafter explained, automatically clears the positive "1" previously registered on the counting dials, and starts the registering mechanism rotating in the negative direction, subtracting the divisor (or to be more exact a decimal multiple thereof) from the dividend, and registering on the proper counting dial the number of subtractions thus made.

This subtraction continues to be repeated until the completion of the revolution which brings the remainder to less than zero, whereupon the registering mechanism is automatically reversed one revolution, thus leaving on the counting dial a register of the maximum number of subtractions that may be made without a negative remainder, and leaving on the numeral wheels the net remainder after making this number of subtractions.

The carriage is then automatically shifted one position to the left (thus giving the divisor one-tenth of its former value with reference to the set-up on the numeral wheels) and the subtraction again automatically commenced, the number of subtractions in the new position being registered on the next counting dial to the right of the one previously actuated.

This process is automatically continued and the quotient registered digit by digit on the counting dials, until the carriage has reached its extreme left position and the possible number of subtractions in that position registered on the last counting dial to the right. Thereupon all calculating mechanism is automatically brought to rest. If for any reason, after an automatic division has been commenced the operator does not care to have it carried to completion as outlined above, he may terminate the process and bring the calculating mechanism to rest by depressing and releasing the "minus" key. He may thereafter at his option complete the division as hereinafter described, or clear the machine and use it for any other calculations he may desire.

2. Automatic locking and clearing mechanism

As mentioned above the figure "1" recorded in the counting dials by the act of registering the dividend on the numeral wheels is automatically cleared by the depression of the "divide" key. If for any reason a figure greater than "1" appears on any counting dial at the time a division is to be commenced means are provided for locking the "divide" key so that the division can not be started until the counting dials are cleared. It is thus impossible, with my invention, to perform an automatic division without the counting dials being cleared and ready to properly register the quotient. This result is accomplished as follows:

Extending from stem 127 of "divide" key 126 is a projection 128 (Fig. 6) which engages lever 129, which in turn is pivotally mounted on fixed axis 130. The opposite end of lever 129 extends into the carriage and presses against the bottom of bar 131 which extends horizontally past all counting dials and far enough to the right to be at all times above lever 129. Attached to each counting dial 37 is a notched disc 132, and directly beneath each disc is a lever 133 all of which levers are pivotally mounted on shaft 134 and rigidly attached to bar 131 as shown in Fig. 8. Each lever 133 has an upwardly pointed projection or tooth 135, and each disc 132 has a notch 136 so placed that when projection 135 is approximately opposite the deepest part of the notch the counting dial will register "0". As will be evident from the previous description of the counting mechanism, positive numbers are registered by a clockwise rotation of the dial from its zero position, as viewed in Fig. 6, and negative numbers by the opposite rotation. The radius of disc 132 and the depth of notch 136 are such that when projection 135 is held down by the outer periphery of the disc the rear end of lever 129 is depressed to such an extent that the front of the lever is raised into a position that will not allow of depressing key 126 sufficiently to start the operation of division, while when projection 135 is in the deeper part of the notch 136 the front end of lever 129 is lowered so as to allow of full depression of the key.

Notch 136 is shaped as shown in greater detail in Fig. 27, so that if the dial is set at positive "1" when key 126 is depressed, the upward pressure of projection 135 on the side of notch 136, as transmitted from the key to the projection through lever 129, bar 131, and lever 133, will cause the disc to rotate and carry the dial back into the "0" position. In Fig. 27, line 137 represents the position on the disc of the radius to projection 135 when the dial is on positive "1". Line 138 represents such a radius for a "0" setting, and line 139 for a setting of negative "1". Radius 137 intersects the side of notch 136 at a point where it has a steep enough pitch so that the pressure of the projection against the side of the notch can rotate the disc. This pitch continues approximately to the intersection with radius 138, so that the pressure exerted by the depression of key 126 will carry the dial into its zero position. At the intersection with radius 139 the side of the notch is flattened out sufficiently so that even if the operator should keep his finger on key 126 after the dial had rotated into this position there would be no tendency to return it to zero. With the notch shaped as indicated a dial in the negative "1" position will effectually lock key 126 to guard against erroneously starting a division, for it takes practically a full depression of key 126 to start the division and any considerable raising of the front end of lever 129 will prevent such a depression.

Thus all counting dials must be on "0" or positive "1" before the "divide" key can be depressed and any dials that are on positive "1" will be carried to "0" by the depression of that key before the division is actually started.

3. Negative operation of registering mechanism

Figures 16, 18:
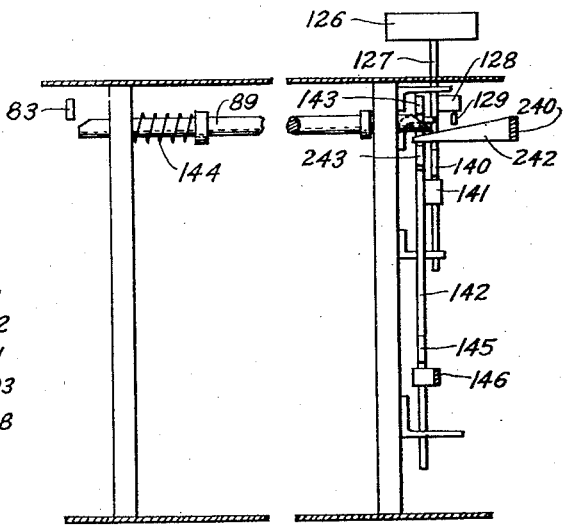
Fig. 16 is a front view of the "divide" key and the mechanism directly associated with it.
Fig. 18 is a plan of the mechanism shown in Fig. 17.

The depression of "divide" key 126 (which is normally held up by the tension of spring 127a) in addition to insuring the clearing of the counting dials, as above explained, starts the registering mechanism continuously revolving in the negative direction, as follows:

Projection 140 extending forward from stem 127 of "divide" key 126 engages projection 141 which extends laterally from the auxiliary slide-bar 142, which bar is mounted to slide parallel to the stems of the operating keys, and is normally held up by spring 142a. The bevelled end of rod 89 normally extends under projection 143 of slide-bar 142, and extends laterally across the machine (Fig. 16). When the "divide" key is depressed the pressure of projection 143 against the bevelled end of the rod slides it to the left against the pressure of spring 144. The opposite end of bar 89 is thus brought directly beneath arm 83 of trip 77, preventing the lowering of that arm, and causing trip 77 to rotate clockwise (as viewed in Fig. 9) when pin 78 is lowered by the depression of an operating key. So long as rod 89 is under arm 83, arm 80 can not slide under projection 84 and trip bar 85, but trip 77 will return to its original position upon the raising of the operating key without tripping said bar or stopping the registering mechanism.

As will be noted from the arrangement of parts, when "divide" key 126 is depressed the first part of the movement of the key places rod 89 so as to prevent the tripping of the "stop" mechanism, while throughout the remaind' r of the movement projection 145 on slide-bar 142 engages projection 146 on the lower part of the "minus" key stem 102 and depresses it, thus starting the registering mechanism revolving in the negative direction. At this point the operator should release key 126 and leave the machine to complete the calculation, but if he does not disc 132 on the particular counting dial being operated will act as a cam against projection 135 thus causing the rotation of levers 133 and 129 in such a manner as to force the return of "divide" key 126 through the greater part of its range. The return of the "divide" key by release or as mentioned above will return member 51, lever 61, and trip 77 to their original positions and leave the registering mechanism continuing to revolve in the negative direction, with no further attention from the operator.

4. Reversal of registering mechanism

Each numeral wheel gear 28 has extending laterally from one of its teeth, tooth 147 (Fig. 13), a pin 148 for use in connection with the carrying mechanism, as explained in Reissue Patent 13,841 above mentioned and designated as part $q$ in connection with said patent. In each position of the carriage, one such gear 28 will engage the last intermediate gear 27 on the left of the machine and pin 148 on this gear 28 will engage at one part of its revolution a cam consisting of tooth 150 pivotally mounted at 151 on lever 152. The tension of spring 153 tends to rotate tooth 150 in a counter-clockwise direction as viewed in Fig. 13, but the pressure of pin 154 on tooth 150 against lever 152 prevents such rotation.

When numeral wheel 29 registers "0", tooth 147 and pin 148 are in the position shown in Fig. 13. When it registers "9" they are in the position in which tooth 149 is there shown. Whenever the value registered on the numeral wheels is reduced to less than zero the number registered on the numeral wheel engaged with the last intermediate gear to the left is changed from "0" to "9". When this takes place pin 148 will engage tooth 150 and rotate lever 152 on its fixed axis 155, thus raising the opposite end of said lever so that shoulder 156 of member 157 slides under lever 152, thus lowering arm 158 so as to be engaged by arm 159, in exactly the manner that arm 107 is engaged by arm 111 when the "stop" mechanism is tripped, as explained under Section D of these specifications. Member 157 is pivoted at 160 to member 161, and both members 161 and 159 are pivoted on shaft 76, so that at the completion of the revolution which trips lever 152 member 161 will be rotated toward the front of the machine until the registering mechanism is released or reversed. Support 163 is provided for shoulder 162 of member 161 to cushion against at the time the release and reversal takes place.

In order to make it possible to use the "minus" key to subtract to less than zero if desired, means are provided to prevent the above described action taking place when the "minus" key is being used. This means consists of a rod 257a, joined by an arm 257b so as to move in unison with a short rod 257c which has a bevelled end extending into slot 258 on stem 101 of "minus" key 100 (see Figs. 13, 7, 6, 17, and 18), the arrangement being such that when the "minus" key is depressed the top of the slot engages the bevelled end of rod 257c and slides it to the left along with rod 257a, against the pressure of spring 259, so that the left end of rod 257a, bevelled in a vertical plane engages projection 260 rigid with shoulder 156 and thus prevents the tripping of member 157 when lever 152 is tripped.

The rotating forward of member 161 on axis 76 accomplishes three results. It rotates arm 164 (which is rigid with member 161) upward (Fig. 13), thus raising pin 165 against a portion of member 57 as shown in Fig. 9 in such a way as to throw member 57 from a negative to a positive position, thus reversing the registering mechanism. Member 161 at the same time presses against arm 166 (Fig. 13) which is rigid with catch 53 and rotates it upon its axis 167 (Fig. 9) so as to unseat the catch from notch 55, thus freeing member 51 from shaft 50, and making it possible to reverse the registering mechanism even though the operator should still have his hand on the "divide" key. The third effect of the rotation of member 161 is the shoving forward of bar 168 by the pressure of member 161 against roller 169, which is mounted on a horizontal axis rigid with bar 168 and extending laterally from it (Fig. 13). The shifting of this bar prepares both for the stopping of the registering mechanism and the shifting of the carriage as hereinafter explained.

After the reversal of the registering mechanism, as it moves in the positive direction, member 161 and arm 164 return to their original places, and shoulder 156 catches against the end of lever 152 thus raising arm 158 clear of arm 159. The completion of the first full forward stroke returns pin 148 to the position in which it is shown in Fig. 13, tooth 150 rotating on its pivot 151 and not disturbing lever 152.

5. Stopping of registering mechanism to shift carriage

Bar 168 is supported at its front end by a pin 170 which extends through slot 171 in said bar. This allows the bar to rotate about said pin. The slot also fits the pin loosely enough so that a small degree of rotation of the bar from side to side is possible. At the rear end of the bar is a support 172 having a downwardly opening and diverging groove 173 against the top of which bar 168 is held by the tension of spring 174 (see Figs. 13 and 15). The top of bar 168 has two notches 175 and 176 which seat against the top of groove 173 in such a way as to hold the bar definitely in its backward or forward position. Rigid with bar 168 is an upwardly extending arm 177, which is pulled to the left by the tension of spring 178, but the rotation of which is limited by arm 179 which extends horizontally from support 172. Extending laterally from arm 177 is pin 180, which when bar 168 is slid forward is directly over the rear end of trip-bar 85 as indicated in Fig. 9. Bar 168 also has a projection 181 which extends with its tip directly under connecting-rod 73.

As set forth above, under Section E—4 of these specifications, bar 168 is slid forward by the rotation of member 161 on its axis 76. This rotation takes place during negative operation of the registering mechanism, during which crank 71 rotates in a clockwise direction as viewed in Fig. 13. The rotation of member 161 commences as crank 71 passes the neutral position in which it is indicated in Fig. 13, and continues throughout approximately the same angle of rotation as that required for stopping the registering mechanism, as described above in Section D of these specifications, which angle may approximate a sixth of a revolution. Simultaneously with the shoving forward of bar 168, the rotation of member 161 serves to reverse the registering mechanism, as described under Section E—4 above, and as the rotation of crank 71 reaches the limit of rotation above mentioned (which finds it extending almost directly upward from crank 24) bar 168 reaches its forward position and simultaneously the registering mechanism reverses, setting crank 71 rotating in a counter-clockwise direction, as viewed in Fig. 13.

During the lower part of its rotation projection 182 on connecting-rod 73 describes the path shown by the dotted line 183 (Fig. 13). This passes clear of projection 181 in its backward position, but engages it in its forward position, with the result that when connecting-rod 73 reaches this part of the stroke on its first forward revolution after reversal the rear part of bar 168 is depressed by projection 182 hitting projection 181. Pin 180 is thus lowered tripping bar 85, thus stopping the registering mechanism on the completion of the revolution in the manner previously described under Section D of these specifications.

Bar 168 remains in its forward position during the operations incident to the shifting of the carriage and the starting of the registering mechanism in the new column, as described below under Sections E—6 and E—7 of these specifications. However when the registering mechanism is thus started in its new column, it is revolving in a negative direction, causing crank 71 to revolve in a clockwise direction as viewed in Fig. 13, and during the first negative revolution thus caused the rear face of projection 182 will engage the front face of projection 181 and return bar 168 to the position in which it is shown in Fig. 13, without any lowering of bar 168 other than the slight amount incident to notch 176 sliding away from support 172, and therefore without tripping bar 85.

6. Shifting mechanism

The shifting of the carriage from column to column during division is accomplished by mechanism which is engaged and disengaged by the action of a shifter clutch. This clutch consists of a disc 184 from which two pins 185 extend perpendicularly, and engage (when the disc is close enough to allow of it) two lugs 186 which project from the edges of another disc 187 (Figs. 26, 24, and 19). Shaft 188 is continually rotated, while the motor is running, in a counter-clockwise direction as viewed from the front by gear 189 which meshes with worm 190 rigid with shaft 3. Slidably mounted on and keyed to the opposite end of shaft 188 is a thimble 191 to the end of which disc 184 is rotatably attached. Slidably mounted on thimble 191 and keyed to it is a collar or ring 192 which is held against disc 184 by pressure of spring 193, the opposite end of which presses against shoulder 194 of thimble 191. Guided between shoulders 194 and 195 of thimble 191 is shifting fork 196 the motion of which controls the sliding of thimble 191 along shaft 188. Spring 197, backed against collar 198 tends to push thimble 191 off of shaft 188 while normally hook 199 engages fork 196 and thereby prevents such movement (Figs. 19, 21, 22, and 25).

Hook bar 199 is pivotally mounted on vertical axis 200, and fastened on top of it is a plate 201, three pins 202 on hook bar 199 extending through slots 203 on plate 201 in such a manner as to allow of limited lateral movement of the plate. This plate also has a long slot 204 extending somewhat diagonally across it, into which extends pin 205 rigid with bar 168. At the right end of plate 201 is a projection 206 of such length that when plate 201 is slid to the right it extends back of bumper 67, while when the plate is slid to the left it is clear of the bumper. The slant of slot 204 is such that when bar 168 is forward plate 201 is slid to the right, and when the bar is back, to the left. Thus when bar 168 is forward projection 206 is back of the bumper, and when the bar is back it is clear of the bumper.

Bumper 67 is slidably mounted on bar 66 by two pins 207 (Fig. 11), which extend through slots 208 on the bumper. It is normally held in its fully extended position by the tension of spring 209. However when the "stop" mechanism is tripped it is dropped back of connecting-rod 73 just as the registering mechanism reaches its neutral position at the close of the stopping operations (as described in Section D of these specifications, above). The momentum of the registering mechanism carries connecting-rod 73 past its neutral position and causes it to kick back against bumper 67, thereby kicking said bumper back along bar 66. This entire action is exactly similar to that which takes place in the mechanism disclosed in the Chase Patent No. 1,566,650, above mentioned, and bumper 67 immediately recovers under the tension of spring 209 exactly as in that mechanism. The only new departure herein disclosed in connection with this mechanism is the utilizing of the recoil of bumper 67 to trip the shifter clutch, which is accomplished as follows:

Whenever the registering mechanism is brought to a stop with bar 168 in its forward position the recoil of bumper 67 against projection 206 will rotate plate 201 and hook 199 upon vertical axis 200, thus kicking the hook clear of fork 196 and allowing thimble 191 to slide forward under the pressure of spring 197. Hook 199 recovers under the tension of spring 210, but having released fork 196 can not again engage it until the fork is forced back of the shoulder of the hook. The shifting forward of thimble 191 engages the shifter clutch in the manner above described, and disc 184 being rotated by the friction of collar 192 against it allows of sufficient give to transmit the motion smoothly.

Since the recoil of bumper 67 serves to engage the shifter clutch only when bar 168 is forward, and since bar 168 is only shifted forward by the sequence of operations incident to the reversal of the registering mechanism (as described above in Section E—4 of these specifications) and shifted back again when negative operations of the mechanism is again instituted (as described above in the last paragraph of Section E—5 of the specifications), the shifter clutch can only be engaged by a "stop" operation taking place between the time of these two shifts. From the sequence of operations previously described it will be apparent that at the completion of calculations in each column (with the exception of the last column, see Section E—8 of the specifications), a "stop" operation (as described above in Section E—5 of these specifications) takes place during the time that bar 168 is forward, and therefore serves to engage the shifter clutch.

Disc 187 which is thus set rotating is rigid with shaft 211, which on the opposite end is rigid with gear 212. This gear meshes with a geared segment 213 pivotally mounted on shaft 214, which in turn is supported on two spring leaves 215, this form of support being chosen in order to avoid the possibility of the segment becoming jammed in meshing with gear 216. This gear is pivotally mounted on shaft 217, on one end of which is handle 218 and on the other double crank arm 219, for shifting the carriage in the manner described in U. S. Patent, Reissue 13,841. On the back face of gear 216 are bevelled teeth meshing with those on collar 220; which is slidably mounted on shaft 217, keyed to it and pressed against gear 216 by spring 221, the entire arrangement being such that when gear 216 rotates in a counter-clockwise direction, as viewed from the front, it engages collar 220 and shifts the carriage to the left, but when it rotates in the opposite direction it turns freely on shaft 217.

The rotation of gear 212, when engaged by the shifter clutch, rotates segment 213 in a clockwise direction as viewed from the front, engaging gear 216, and rotating it in a counter-clockwise direction until the shifter clutch is disengaged, thus shifting the carriage to the left. If the shifter clutch is disengaged when gear 216 has rotated at any amount between one quarter and one half turn, the carriage will drop into the next column position by gravity.

As will be noted in Fig. 25, shifting fork 196 consists of a flat arm the outer end of which is arranged to engage thimble 191 in the manner previously described, while the inner end is pivotaly mounted on an approximately vertical axis 222. Extending forward, approximately perpendicular to the face of the fork 196 is an arm 223 rigid with the fork, the face of the arm being approximately parallel to the adjacent portion of the circumference of segment 213 (Fig. 20). At the end of this arm projection 224 extends downwardly approximately radial to the segment and approximately perpendicular to arm 223. This projection acts as a trigger to allow of storing up energy to return thimble 191 and disengage the shifter clutch, without allowing such motion to take place until ample energy is stored to complete it, as follows:

Mounted on the front face of segment 213 and rigid with it is lug 225, the outer face of which is concentric with the segment. When hook 199 is tripped and the shifter clutch engaged, the motion of fork 196 carries projection 224 forward past the upper end of lug 225. As the rotation of segment 213 commences lug 225 slides back of projection 224 thus preventing its return until the full length of the lug shall have passed the projection. A slot 226 concentric with segment 213 exists in the segment, and through this slot extends rod 227, attached at the rear to fork 196 and supported at the front by a fixed mounting 228. Wound about this rod is a coiled spring 229 pressing at the front against washer 230 and at the back against fork 196. On each side of slot 226 and parallel to its edges is a ramp 231 (Figs. 23 and 21), rigidly attached to the back face of segment 213, and so arranged that as the segment is rotated upwardly the ramps force washer 230 rearwardly on rod 227 and compress spring 229. The strength of spring 229 is such that by the time it receives the compression given it by this arrangement it is capable of overcoming spring 197 and forcing fork 196 back of the shoulder of hook 199. The length of lug 225 is such that it will have passed completely out from behind projection 224 shortly before shaft 217 completes a half revolution. Thereupon fork 196 will be forced back and retained by hook 199 and the shifter clutch disengaged, while segment 213 thus freed will return to its initial position under the tension of spring 232.

*7. Starting registering mechanism in new column*

As segment 213 rotates upward in order to shift the carriage as previously explained, an arm 233 (Fig. 20), rigid with segment 213, rotates downwardly, engaging lever 234 and rotating it on its fixed pivot 235 against the tension of spring 236, finally moving past the end of it and letting lever 234 return to its initial position under the tension of spring 236. When the shifter clutch is disengaged (as takes place at the completion of each shift in the manner described in the preceding paragraph) and segment 213 returns to its original position under the tension of spring 232, arm 233 again engages lever 234 rotating it in the opposite direction before passing clear of it, and thus depressing projection 237 on lever 238. This in turn rotates lever 238 on its fixed pivot 239 thereby raising the front end of lever 240, rotating it on its pivot 241 (Fig. 6) and lowering projection 242 on the opposite end of said lever so as to engage projection 243 on auxiliary slide-bar 142, and thus depress the slide-bar and start the registering mechanism rotating in the negative direction in exactly the manner described for the previous carriage position when this slide bar was depressed by the depression of the "divide" key. (See Section E—3 of these specifications.)

8. *Stopping at completion of division*

The operations thus far described in connection with division form an endless cycle for the carrying on of the operations necessary to division in column after column, the completion of each operation automatically starting the next succeeding operation. The operations in each column are essentially similar to those in each preceding column until the carriage reaches its extreme left position and the machine is registering on the last counting dial to the right. As the carriage is shifted into this position intermediate support 244 of the carriage engages the end of lever 245 (see Figs. 13 and 14), thereby rotating it on its fixed axis 246. Also mounted on this axis is lever 247 which is pulled in a counter-clockwise direction by spring 248 but normally prevented from rotating by pressure against pin 249 in lever 245. When lever 245 is rotated by support 244 the entire tension of spring 248 tends to rotate lever 247 and presses it against the upper part of bar 177 which is rigid with bar 168 as previously described. This presses bar 177 against member 250, which is pivotally mounted on the approximately horizontal shaft 251 (see Figs. 13, 14, and 15).

The width of member 250 is such that when bar 177 rests against it, it prevents projection 252 on bar 177 moving over into the plane of connecting-rod 73. When the reversal mechanism is tripped and bar 168 slid forward (as described in Section E—4 of these specifications), bar 177 slides forward along member 250. When, after reversal, projection 182 of connecting-rod 73 engages projection 181 (as described in Section E—5 of these specifications), and lowers bar 177, the end of bar 177 drops below the edge of member 250. Except when the carriage is in the last column the tension of spring 178 holds bar 177 away from member 250 so that bar 177 returns to its same position immediately after being thus lowered. When the carriage is in the last column, however, the pressure of lever 247 exceeds the tension of spring 178 and forces bar 177 against member 250, as above described. When therefore, under these circumstances, bar 177 drops below the edge of member 250, which has been supporting it, lever 247 forces it over against shoulder 253, thereby bringing projection 252 into the plane of connecting-rod 73. As bar 177, after being depressed, springs upward under the tension of spring 174, it rotates member 250 upwardly on its axis 251, and bar 177 continues to rest against shoulder 253, with projection 252 remaining in the plane of connection-rod 73.

After depressing projection 181 and tripping the "stop" mechanism as heretofore explained, (see Section E—5 of these specifications) the registering mechanism completes the counter-clockwise rotation on which it is then engaged, returning to the neutral position. In so doing projection 254 of connecting-rod 73 traverses the path shown by dotted line 255 (Fig. 13) thereby engaging projection 252 and returning bar 168 to its original position, so that by the time the "stop" operation is completed and bumper 67 is kicked, (which does not take place until the neutral position is reached) projection 206 is no longer back of it and the shifting mechanism is not tripped. The registering mechanism having come to a stop without engaging the shift mechanism all calculating mechanism remains at rest in its neutral position.

When the carriage is shifted out of the last column the pressure of lever 247 against bar 177 ceases, bar 177 is pulled out from under member 250 by the tension of spring 178, and member 250 returns to its original position under the tension of spring 256.

9. *Stopping division before completion*

An operator may sometimes desire to bring the calculating mechanism to rest before the completion of an automatic division, as for instance if he does not care for the result to as many figures as the machine with the set-up he is using is capable of registering, or if he discovers an error in the dividend or divisor he has used, or if the "divide" key has been depressed without any divisor being set up on the keyboard. This result may be accomplished by depressing and releasing the "minus" key. Such action will result in the tripping of lever 85 and stopping of the registering mechanism in exactly the manner previously described under Section D of these specifications. As the machine is thus brought to a standstill in its normal neutral position, it is then possible at the option of the operator to complete the division which has been started by writing down the digits of the quotient which have been registered, clearing the quotient register and again depressing the "divide" key, whereupon the remaining digits of the quotient will be automatically registered in their proper decimal positions, or to clear the machine and use it for other calculations.

In order to avoid any possibility of conflict between the registering and shifting mechanisms due to the "minus" key being thus depressed at just the time that a shift is taking place or about to take place, rod 261 is arranged to slide under stem 102 of "minus" key 100 (see Fig. 17) whenever bar 168 is in its forward position, this rod sliding back under the pressure of spring 262 when bar 168 is shoved back. The movement of rod 261 is accomplished by lever 263 (Figs. 13 and 14), the diagonal end of which is engaged by projection 264 on bar 168 when that bar is slid forward, the lever thereby being rotated on its axis 265 so that its lower end presses against rod 261 and shoves it to the right.

10. *Starting division in proper column*

While it is easy for an experienced operator on a machine such as described to start a division with the carriage in the furthest position to the right in which the divisor can be subtracted from the dividend and leave a positive remainder, there is the possibility that an inexperienced operator may start the division with the carriage too far to the right or left. If he starts with the carriage too far to the right the machine automatically finds the proper column to commence recording the quotient, for the first revolution of the registering mechanism in the initial column will leave a negative remainder thus tripping the reversal mechanism, bringing the counting dial back to "0," shifting to the next column and again repeating the process until a column is found in which the first subtraction leaves a positive remainder.

With the machine as thus far described, if an operator were to start with the carriage one column too far to the left, the registering mechanism would perform from 11 to 100 subtractions in the first column before reversing. The result as recorded on the counting dials at the completion of the division would, of course, be erroneous, and while the experienced operator would probably note the unusual action of the machine in its first column it is desirable to prevent the machine completing the division in case the initial set of the carriage is too far to the left, and my invention provides for so doing. This result is accomplished as follows:

Rigid with each counting-dial disc 132, and so positioned as to engage tooth 135 just as the dial is passing from a black (positive) 9 to a black (positive) 8 position, is a tooth 266 (Figs. 6 and 27). Extending across the machine back of the "divide" key is a shaft 267 rigid with the right end of which is arm 268 and projection or pin 269 (Fig. 6). Arm 268 is normally held down by spring 270 against bracket 271 in such a position that pin 269 is immediately above the position lever 129 assumes when a tooth 135 is on the outer circumference of a disc 132. A tooth 266 engaging a tooth 135 raises the front end of lever 129 an additional amount sufficient to raise pin 269 and rotate shaft 267. Rigid with the opposite end of shaft 267 are arm 272 and projection 273 (Figs. 9 and 10), which are raised by the rotation of shaft 267 just mentioned. Rigid with member 57 is a shaft 274 on which lever 275 is so mounted that when member 57 is set to cause negative rotation the rear end of lever 275 is in a position to be engaged by projection 273 when it is rotated upwardly, and projection 276 on the front end of said lever to thereupon depress the rear end of trip-lever 85 and trip the "stop" mechanism, while when member 57 is in a position to cause positive rotation, shaft 274 is moved forward sufficiently to move lever 275 out of the range of projection 273, and the rotation of shaft 267 will not affect the stop mechanism. In conjunction with lever 275 a bumper or guide 277 is provided, attached to the top cover 278 of the machine, this guide being such as to keep the rear end of lever 275 always above projection 273, throughout the shifting of shaft 274.

The effect of the above arrangement is to cause the tripping of the "stop" mechanism whenever a tooth 266 engages a tooth 135 during a negative rotation, but to render the engaging of said teeth on a forward revolution of no effect. Therefore if in any column the machine makes more than ten subtractions it will be stopped. If an operator starts a division with the carriage too far to the left, more than ten subtractions will be performed in the first column, and the machine stopping shortly after starting, without shifting, and with a black number showing in the counting dials, serves as an indication to the operator that he has started with the carriage too far to the left.

F. SUMMARY OF OPERATION

The sequence of operations throughout a complete division calculation are indicated diagrammatically in Figs. 28 to 33, inclusive, and a study of these diagrams in the light of the explanation of these figures given at the beginning of these specifications will give a clear idea of the sequence of operations and the effect of each operation toward causing subsequent operations. The principal operations only are listed in the figures, but the minor operations incident to each operation listed may be readily determined by reference to the foregoing specifications. The figures will in this manner serve to make clear the relative sequence and inter-relation of all the operations incident to a complete automatic division calculation. In addition to thus diagrammatically summarizing the operation of the machine, the following description will also serve as a complete summary of all the principal operations incident to a complete automatic division calculation.

To carry out such a calculation the dividend is first registered on dials 29 by means of keys 25 and plus key 43, if not already appearing on said dials as a result of previous calculations. The keyboard is then cleared and the divisor set on keys 25. If any digits other than "zeros" and positive "ones" appear on dials 37 they are cleared by means of crank 42. Key 126 is then depressed. (If dials 37 have not been cleared either before or after registering the dividend, discs 132 on the uncleared dials will hold corresponding projections 135 in such a position that lever 129 will prevent key 126 being sufficiently depressed to start operation. If any dial 37 stands at positive "one," with the remaining dials 37 either in a similar position or clear, the pressure of its corresponding projection 135 against the side of notch 136 will clear the dial before operation commences.)

The full depression of key 126 institutes the process of division which is automatically carried to completion as follows:

The depression of key 126 depresses slide-bar 142. The first part of this depression serves to slide rod 89 into a position to restrain arm 83, while the lower part of said depression serves to depress stem 102 and institute negative operation of the registering mechanism, which operation serves to repeatedly subtract from the dividend, the divisor multiplied by a decimal factor determined by the lateral position of carriage 30. The number of such subtractions is registered by finger 38 on the dial 37 corresponding to the particular carriage position. The first rotation of a dial 37, incidental to the first such subtraction, forces outward the projection 135 corresponding to that dial, which in turn rotates lever 129 sufficiently to partially return key 126 and return stem 102. Stem 102 being released while arm 83 is restrained by rod 89, members 51, 61, and 77 return without tripping the stop mechanism, leaving the registering mechanism continuing to rotate in the negative direction. Key 126 may be released at the operation's option any time after operation starts, and such release serves to release slide-bar 142 and to return rod 89. Stem 102 will be released in advance of the return of rod 89, even should key 126 be released in advance of dial 37 forcing the release of stem 102 in the manner previously described, for the reason that the first part of the up stroke of key 126 will release stem 102, whether such upward motion be forced by dial 37 or optional on the part of the operator, and the last part of the up stroke will release rod 89.

The negative operation of the registering mechanism thus instituted continues until the remainder on dials 29 becomes less than zero. As the particular rotation of the registering mechanism which brings this to pass approaches completion, pin 148 trips lever 152, lowering arm 158 to where it is engaged by arm 159 as the registering mechanism passes its neutral point. The continued motion of the registering mechanism thereupon causes member 161 to rotate forward on axis 76, producing the following three results: catch 53 is unseated from notch 55 thus permitting of reversing the registering mechanism even though the operator may still have his hand on key 126, bar 168 is shoved forward producing several results hereafter mentioned, and pin 165 is raised against member 57 thereby reversing the registering mechanism and setting up positive rotation. This positive rotation returns member 161 to its original position, which moves catch 53 back into a position for reseating and returns arm 158. The positive rotation taking place with bar 168 slid forward, as above mentioned, results in projection 181 of bar 168 being engaged by projection 182 of connecting-rod 73, thereby tripping bar 85 and stopping the registering mechanism on the completion of the single forward revolution. This forward revolution results in pin 148 being returned to its first position without again tripping lever 152, due to the manner in which tooth 150 is pivoted to said lever, and it also results in dials 29 registering the difference between the dividend and the largest integral multiple of the largest decimal multiple of the divisor contained therein, while the actuated dial 37 registers said integral factor, which constitutes the first digit of the desired quotient.

As above mentioned the tripping of bar 85 stops the registering mechanism, this being accomplished by releasing arm 104, thereby lowering arm 107 so that it is engaged by arm 111 as the registering mechanism completes its revolution and passes the neutral point. The movement of the registering mechanism thereafter continues for a portion of a revolution, carrying member 110 forward, dropping bumper 67 onto pin 74, raising pin 115 against member 57 so as to disconnect the registering mechanism from its motive power and allow it to reverse under the tension of spring 117, bumper 67 dropping back of pin 74 as it again passes the neutral point. Bumper 67 thereupon prevents the registering mechanism departing by more than a very small range from its neutral position, but the momentum of the registering mechanism is such that in bringing it to a standstill bumper 67 is kicked back on bar 66 against the tension of spring 209. Bar 168 having been shoved forward as described in the preceding paragraph, all this action takes place while that bar is still forward. One of the results of sliding bar 168 forward is to slide plate 201 laterally into a position in which projection 206 extends back of bumper 67, in such a position that when bumper 67 is kicked back, as above mentioned, plate 201 is rotated on its axis 200 with the result that hook 199 releases shifting fork 196, allowing thimble 191 to shift forward under the pressure of spring 197 thereby engaging the shifter clutch and rotating segment 213 upward. The release of fork 196 also acts to simultaneously move projection 224 in front of lug 225 so that as segment 213 rotates upward it is locked forward by the lug. This results in ramp 231 compressing spring 229 as segment 213 continues to rotate upward, while simultaneously gear 216 rotates shaft 217 toward the left, operating to shift the carriage through the action of crank arm 219. As these rotations become sufficient to effect a carriage shift of one column, lug 225 passes clear of projection 224. Spring 229, having been compressed as above mentioned, acts to return fork 196 to its original position as soon as projection 224 is thus released, thereby disengaging the shifter clutch. Hook 199 catches and retains fork 196, while segment 213 returns under the tension of spring 232 as soon as the shifter clutch is released, gear 216 sliding on collar 220 and returning without shifting the carriage.

At this stage of the operations dials 29 register the positive remainder resulting from the determination of the first digit of the quotient, the registering mechanism is stopped, and bar 168 is in its forward position holding projection 206 of plate 201 back of bumper 67. As segment 213 returns, as above mentioned, arm 233 rigid therewith rotates lever 234, which through the action of intermediate levers serves to lower projection 242 and thereby depress slide-bar 142. This depression serves to set up negative operation of the registering mechanism in the new column in exactly the manner previously described for the beginning of the division calculation, except that immediately after depression slide bar 142 is immediately completely returned by spring 142a (unless the operator still has his hand on key 126), and the sequence of operations formerly described as taking place on the release of key 126 immediately follows such return. Bar 168 being forward, the rear face of projection 182 engages the front face of projection 181 during the first revolution of the registering mechanism and returns bar 168 to its rear position without depressing it except the slight amount incident to notch 176 sliding away from member 172. Projection 206 is thereby slid away from behind bumper 67, and the position and function of every part becomes identical with that existing during the negative rotation of the registering mechanism in the former column, as previously described, except that finger 38 is counting on the next dial 37 to the right of the one formerly actuated. The negative operation of the registering mechanism will therefore continue until the remainder on dials 29 becomes less than zero, whereupon the registering mechanism will be reversed to make one forward turn, stopped, the carriage shifted, and the registering mechanism again started on its negative motion, all as previously described for the preceding column.

It will be noted that the sequence of operations thus instituted forms a continuous chain, in which each operation is automatically caused by a preceding operation or operations, the entire series of operations serving to automatically determine each digit of the quotient and automatically shift the carriage to the next column for the determination of the next digit. The operation of the machine in each column is essentially similar to its operation in each preceding column until the carriage is shifted into its extreme left position. This shift takes place during the same relative sequence of operations as each preceding shift of the carriage, in the manner previously described and diagrammatically illustrated in Fig. 30. When the shift into the last column takes place support 244 engages lever 245, rotating it so that member 247 presses against bar 177 causing that bar to press against member 250. Member 250 prevents bar 177 moving over as a result of this pressure during the remaining operations described in Fig. 30 and during those described in Fig. 31, which include the operations incidental to setting up negative operation of the registering mechanism in the last column and carrying on the subtraction until the remainder becomes less than zero.

Fig. 32 indicates diagrammatically the sequence of operations which thereafter takes place. Pin 148 trips lever 152, arm 158 is lowered, engaged by arm 159, and returned after reversal, member 161 is rotated forward and returned after reversal, catch 53 unseated and reseated, bar 168 shoved forward and projection 206 of plate 201 slid back of bumper 67, all just exactly as in the case of the remainder becoming less than zero in each preceding column. However, when after the reversal of the registering mechanism to make a forward turn, projection 182 engages projection 181 and forces bar 177 lower than member 258, the pressure of member 247 against bar 177 (as above described) causes bar 177 to move over against shoulder 253, bringing projection 252 into the plane of connecting-rod 73 and projection 254. This movement takes place as the forward turn is about one quarter completed. As it is about three quarters completed projection 254 engages projection 252 and carries bar 168 back to its original position thus moving projection 206 clear of bumper 67. The lowering of bar 177, above referred to, trips bar 85 thereby operating to stop the registering mechanism upon completion of the forward turn. As in the case of all stopping operations of the machine, crank 71 proceeds forward a fraction of a revolution past its neutral position and is returned to its neutral position, upon which bumper 67 drops back of pin 74 and is kicked back on bar 66 due to the momentum of the registering mechanism. Projection 206 having been moved clear of bumper 67 at an earlier stage in the forward revolution (as above described), it is no longer in a position to be kicked by the bumper and to engage the shifter clutch as in the preceding columns. The continuous chain of operations, which had kept the machine at work carrying out the division calculation, having been thus broken, and the registering mechanism stopped without the operations, which in previous columns had followed such stopping, having been started, the machine ceases operation, and the last dial 31 on the right of the machine registers the last digit of the quotient within the capacity of the machine.

When subsequently the carriage is shifted out of its last position, as is necessary in preparing for further calculations particularly of automatic division, support 244 moves away from lever 245, so that member 247 will no longer press against bar 177, and that bar will therefore be pulled away from shoulder 253 and member 258 by spring 178, thus automatically leaving all these parts in their proper relative positions for carrying out the processes of automatic division in the earlier columns.

G. STATEMENT OF NEW FEATURES

I am aware that prior to my invention calculating machines have been made capable of performing addition and subtraction in a manner substantially similar to that of the machine described in these specifications. I do not therefore claim invention in connection with the mechanism controlling these operations, but I claim as new the additional mechanism necessary for the automatic performance of division and the special features connected therewith, as set forth more particularly in the appended claims. Parts 1 to 125, inclusive, are included within the scope of previous invention except for certain few alterations in these parts to adapt them to the new mechanism and purposes, while parts 126 to 278, inclusive, are parts newly invented and disclosed in these specifications, with the exception of parts 134, 147 to 149, 207 to 209, 217 to 219, 244, and 278. It is understood that the embodiment of the invention described herein is only one of the many embodiments this invention may take, and I do not wish to be limited in the practice of the invention nor in the claims, to the particular embodiment set forth.

What I claim is:

1. In a calculating machine, the combination of a motor, registering mechanism, a plus key, a minus key, stop mechanism for stopping the registering mechanism upon the release of the plus key or minus key, a trip member for engaging said stop mechanism, a divide key, and means whereby the depression of the divide key will first engage the bevelled end of a laterally slidable rod, sliding it into such a position as to limit the motion of the above mentioned trip member so that the stop mechanism will not be tripped by the releasing of the divide key, and will thereafter set the registering mechanism into negative operation.

2. In a calculating machine, the combination of a divide key, a stem connected therewith, a projection rigid within said stem, an auxiliary slide bar, a projection thereon in such a position as to be engaged by the first named projection upon depression of the divide key, registering mechanism, stop mechanism for stopping the operation of the registering mechanism, a laterally slidable rod, a projection on the above mentioned auxiliary slide bar in such a position as to engage the slidable rod upon the depression of the divide key and slide it into a position in which it restrains the stop mechanism, a minus key, a stem connected therewith, a projection on said stem, a projection on the above mentioned auxiliary slide bar in such a position as to engage said last mentioned projection upon the depression of the divide key and thereby depress the stem of the minus key, means connecting the stem of the minus key with the registering mechanism in such a manner as to cause negative operation of the registering mechanism upon the depression of the stem of the minus key.

3. In a calculating machine, the combination of registering mechanism including a series of numeral wheels, a gear attached to each numeral wheel, and a carrying-pin attached to each such gear, a divide key, means operative upon depression of the divide key for automatically starting the registering mechanism repeatedly and continuously subtracting until the remainder on the numeral wheels is less than zero, means operative upon the remainder thus becoming less than zero for reversing the registering mechanism, said last named means including a pivotally shiftable member for reversing the direction of rotation of the registering mechanism, a lever and a tooth pivoted thereon and so controlled by a spring and by a pin on said lever that when the registration on the operating numeral wheel furthest to the left passes from "0" to "9," the carrying pin on the gear attached to said numeral wheel will trip said lever, but when said registration passes from "9" to "0" will merely rotate said tooth without tripping said lever, and means for engaging the pivotally shiftable member mentioned above upon the tripping off said lever.

4. In a calculating machine, the combination of registering mechanism including numeral wheels, a divide key, a shaft rotatably displaced by the depression thereof in such a manner as to actuate mechanism for initiating operation of the registering mechanism, means operative after the depression of said key for reversing the registering mechanism whenever the remainder in the numeral wheels becomes less than zero, and means for disconnecting the shaft above mentioned from the mechanism actuated thereby.

5. In a calculating machine, the combination of registering mechanism, numeral wheels, stop mechanism for stopping the operation of said registering mechanism, a divide key, means actuated thereby for engaging the registering mechanism, means operative after the depression of said key for reversing the registering mechanism whenever the remainder in the numeral wheels becomes less than zero, means simultaneously operative for placing certain other mechanism in readiness for tripping the stop mechanism, said last named means including a member movable into a position in which it will serve to bring the registering mechanism to a stop following one positive revolution.

6. In a calculating machine capable of automatically performing division, the combination of registering mechanism, stop mechanism for stopping the operation of the registering mechanism, means for automatically determining each digit of the quotient by successive subtraction to a negative remainder followed by reversal of the registering mechanism to effect one addition, and means for automatically stopping the registering mechanism in a neutral position upon the completion of said addition, said means including a member so arranged that it is automatically movable at the time of reversal of the registering mechanism, and means rendered effective by said member and so arranged as to actuate the stop mechanism during the positive rotation of the registering mechanism.

7. In a calculating machine, the combination of registering mechanism, a shiftable carriage, a divide key, means operative upon the depression of the divide key for automatically starting the registering mechanism repeatedly subtracting until the remainder is less than zero, control means immediately operative upon the remainder thus becoming less than zero including a pivotally shiftable member for reversing the direction of rotation of the registering mechanism, means for shifting said pivotally shiftable member so as to reverse the registering mechanism, means automatically operable during the ensuing reverse operation of the registering mechanism for shifting said pivotally shiftable member to arrest the registering mechanism, means for restraining said registering mechanism from effective movement in either direction, and means for shifting the carriage while the registering mechanism is so restrained.

8. In a calculating machine, the combination of registering mechanism, numeral wheels, a divide key, means connected therewith for automatically performing division, a minus key, means connected therewith for repeatedly performing subtraction during the depression of said key, means, and a member for engaging same, operative following the depression of the divide key for reversing the direction of operation of the registering mechanism whenever the remainder in the numeral wheels becomes less than zero, means operative during the depression of the minus key for rendering inoperative the means last above mentioned, said last named means including a laterally shiftable rod, shifted by the depression of the minus key into a position in which it retains the member for engaging the reversing means, thereby preventing the engaging of said means.

9. In a calculating machine, the combination of a shiftable carriage, means for automatically shifting the carriage at the proper times during a calculation of division, said means including a clutch for engaging and disengaging the carriage-shifting mechanism, means for automatically engaging said clutch at the proper time for making a shift, and means operated by the carriage-shifting mechanism during the shift to effect the automatic disengaging of the clutch upon the completion of the shift.

10. In a calculating machine, the combination of a shiftable carriage, means for automatically shifting the carriage at the proper times during a calculation of division, said means including a clutch arranged to engage the carriage-shifting mechanism at the proper times for making a shift, and means operated by the carriage-shifting mechanism during the shift to effect the automatic disengaging of the clutch upon the completion of the shift, said last named means including a spring compressed during the shift to a strength sufficient to complete the disengaging of the clutch, and a trigger to prevent said disengaging taking place before the proper time.

11. In a calculating machine, the combination of a motor, a registering mechanism, numeral wheels in conjunction therewith, a laterally shiftable carriage containing said numeral wheels, means for automatically shifting the carriage including a shaft, a member arranged to rotate with said shaft, another member, means connecting said latter member with the carriage to shift same, means for retaining said members apart so that they may rotate or remain stationary independently of each other, means operative upon the stopping of the registering mechanism for disconnecting said retaining means, means operative thereupon to bring said members into conjunction, means for insuring simultaneous rotation of said members when in conjunction, and means for automatically separating said members upon the completion of the shifting of the carriage, and for retaining them apart.

12. In a calculating machine, the combination of a motor, registering mechanism, numeral wheels in conjunction therewith, a laterally shiftable carriage containing said numeral wheels, and means for automatically shifting the carriage at the proper times throughout a calculation of division to effect the completion of the calculation to the limit of the machine, said means including a shaft continuously rotated during the operation of the motor, a disc rotatable upon said shaft, a longitudinally shiftable member arranged to rotate with said shaft, a spring to force said member against said disc, protrusions extending from said disc and engaging notches or recesses on another disc whenever the discs are placed in close enough proximity to allow thereof, and means connecting said latter disc with the carriage so as to cause the rotation of the disc to shift the carriage.

13. In a calculating machine, the combination of registering mechanism, a laterally shiftable carriage, and means for automatically shifting the carriage at the proper times throughout a calculation of division to effect the completion of the calculation to the limit of the machine, said means including a pivotally mounted geared segment, means connecting said segment with the carriage in such a manner that a partial rotation of said segment will shift the carriage, means for automatically rotating said segment through such partial rotation immediately after the stopping of the registering mechanism during the operation of division, and means for automatically returning said segment to its initial position upon the completion of the shift, said means including a spring overcome by the rotating means but operative upon the disconnecting of said means.

14. In a motor driven calculating machine, the combination of registering mechanism, numeral wheels in conjunction therewith, a laterally shiftable carriage containing said numeral wheels, and means for automatically shifting the carriage including a driving member operable by the motor to shift the carriage, means for operating said member including a power-driven clutch element and a clutch element connected to said member to drive the same, means for bringing said clutch elements together to perform a shift, and means for automatically separating said clutch elements upon the completion of the shift, said last named means including a spring compressed by said member during operation thereof in a direction to effect the separation of the clutch elements, and trigger means to insure the separation taking place at the proper stage of carriage shifting.

15. In a calculating machine, the combination of a laterally shiftable carriage, registering mechanism, means for automatically shifting the carriage when the registering mechanism stops during the automatic performance of division, counting dials, means for automatically determining the quotient of two numbers and for registering the respective digits thereof on the counting dials proceeding successively toward the right, and means for automatically stopping the calculating mechanism when the last digit on the right has been recorded, said last named means including a lever engaged by the carriage as it is shifted into its extreme left position, and means controlled by said lever and operated while said carriage is stationary to render inoperative the mechanism which in other positions of the carriage acts to initiate operation of the carriage-shifting mechanism upon the stopping of the registering mechanism.

16. In a calculating machine, the combination of registering mechanism, a shiftable carriage, counting dials, means for automatically determining the quotient of two numbers, means for registering the respective digits of the quotient on the counting dials proceeding successively toward the right including means for shifting the carriage upon the completion of the registering of each digit, a slidable member the sliding of which places certain other mechanism in such a relative position that the registering mechanism will engage the carriage-shifting mechanism as an incident to a stopping operation, and means for stopping the calculating mechanism when the last digit on the right has been recorded, said last named means including a lever engaged by the carriage as it is shifted into its extreme left position, and means thrown into action by said lever and subsequently operated to bring about the return of the above mentioned slidable member to its neutral position prior to the stopping of the registering mechanism.

17. In a calculating machine, the combination of registering mechanism, a shiftable carriage, means for automatically shifting the carriage at the proper times during a calculation of division, and means to prevent the engaging of said last named means when the carriage has reached its extreme left position, said last named means including a slidable member, a projection thereon, another projection moving in such a manner that when it engages the first named projection it slides the slidable member into a position in which it renders inoperative the carriage-shifting mechanism, means for bringing said projections into engagement as the computation is completed in the extreme left position of the carriage, means to prevent the projections engaging prematurely, said last named means including a restraining member retaining said projections in separated planes until the last revolution of the registering mechanism has commenced, means operative thereupon for moving said restraining member out of its former position so as to allow of the engaging of said projections.

18. In a calculating machine, the combination of registering mechanism, a connecting-rod operated thereby, a projection on said connecting-rod, a laterally-shiftable carriage, means for automatically shifting said carriage to the left during the performance of a calculation of division at the proper times for carrying out said calculation, a slidable member the sliding of which places certain other mechanism in such a relative position that the registering mechanism will initiate operation of the carriage-shifting mechanism as an incident to a stopping operation, and means for preventing the engaging of said carriage-shifting mechanism when the carriage has reached its extreme left position, said last named means including a lever engaged by the carriage as it is shifted into its extreme left position, and means actuated by said lever to bring a projection rigid with the slidable member into engagement with the projection on the connecting-rod and thereby bring about the return of said slidable member to its neutral position.

19. In a calculating machine, the combination of registering mechanism, a connecting-rod operated thereby, a projection on said connecting-rod, stop mechanism for stopping the operation of the registering mechanism and an arrangement for tripping said stop mechanism, a shiftable carriage, means for automatically shifting said carriage to the left during the performance of a calculation of division at the proper times for carrying out said calculation, a slidable member the sliding of which places certain other mechanism in such a relative position that the registering mechanism will initiate operation of the carriage-shifting mechanism as an incident to a stopping operation, and means for preventing the engaging of said carriage-shifting mechanism when the carriage has reached its extreme left position, said last named means including a lever engaged by the carriage as it is shifted into its extreme left position and means actuated by said lever to bring a projection rigid with the slidable member into engagement at the proper time with the projection on the connecting-rod and thereby bring about the return of said slidable member to its neutral position, means for preventing said projections engaging prematurely, said last mentioned means including a pivotally mounted member retaining said projections in separated planes until the stop mechanism is tripped, and means operative thereupon for rotating said pivotally mounted member out of its former position so as to allow of the engaging of said projections.

20. In a calculating machine, the combination of registering mechanism, a connecting-rod operated thereby, a projection on said connecting-rod, stop mechanism for stopping the operation of the registering mechanism and an arrangement for tripping said stop mechanism, a laterally shiftable carriage, means for automatically shifting said carriage to the left during the performance of a calculation of division at the proper times for carrying out said calculation, a slidable member the sliding of which places certain other mechanism in such relative positions that the registering mechanism will initiate operation of the carriage-shifting mechanism as an incident to a stopping operation, and means for preventing the engaging of said carriage-shifting mechanism when the carriage has reached its extreme left position, said last named means including a lever engaged by the carriage as it is shifted into its extreme left position and means actuated by said lever to bring a projection rigid with the slidable member into engagement with the projection on the connecting-rod and thereby bring about the return of said slidable member to its neutral position, and means operative upon the carriage being shifted out of its extreme left position to move the projection rigid with the slidable member out of the path of the connecting-rod.

21. In a calculating machine, the combination of registering mechanism, a shiftable carriage, means for automatically shifting the carriage at the proper times during a calculation of division to carry out said calculation, and means to prevent the engaging of said last named means when the carriage has reached its extreme left position, said last named means including a slidable member, a projection thereon, another projection moving in such a manner that when it engages the first named projection it slides the slidable member into a position in which it renders inoperative the carriage-shifting mechanism, means for bringing said projections into engagement as the computation is completed in the extreme left position of the carriage, means to prevent the projections engaging prematurely, said last named means including a restraining member retaining said projections in separate planes until the last revolution of the registering mechanism has commenced, means operative thereupon for moving said restraining member out of its former position so as to allow of the engaging of said projections, and means operative upon the carriage being shifted out of its extreme left position to again prevent the engaging of the above mentioned projections, and to return the restraining member to its former position.

22. In a calculating machine, the combination of a shiftable carriage, counting dials, means for automatically determining the quotient of two numbers and for registering the respective digits of the quotient on the counting dials proceeding successively toward the right and means for automatically stopping the calculation before the carriage is shifted if the operation is started with the carriage to the left of the proper position for beginning the computation, said last mentioned means including levers and teeth rigid with same, a tooth rigid with each counting dial in such a position as to engage one of said first named teeth and to rotate the lever with which it is rigid when more than ten subtractions are counted on the dial during division, and means actuated by said lever to operate the means for stopping the registering mechanism, said last mentioned means including a member connecting the above mentioned toothed levers to another lever, means connecting said lever to an arm having a projection, a lever pivotally mounted on a shaft the position of which is shifted when the direction of operation of the registering mechanism is reversed in such a manner that the lever will be engaged by the movement of said projection during negative operation and will be out of the range of said projection during positive operation, and means such that the movement of the lever caused by the engaging of the above mentioned teeth during negative operation of the registering mechanism will set into operation the mechanism for stopping the registering mechanism.

23. In a calculating machine, the combination of registering mechanism, a shiftable member the position of which determines the direction of operation of the registering mechanism, counting dials, means for stopping the registering mechanism when any dial reaches a pre-determined position with the registering mechanism rotating in one direction, and means for rendering said last mentioned means inoperative when the registering mechanism is rotating in the opposite direction, said last mentioned means including a lever pivoted on a shaft rigid with the shiftable member above mentioned, means connecting said lever with the mechanism for stopping the registering mechanism, and means engaging said lever only when it is in the position it occupies during the rotation of the registering mechanism in the direction first above mentioned and connecting said lever with certain mechanism operated by the above mentioned dial as it comes into its predetermined position.

24. In a calculating machine, the combination of registering mechanism, means for automatically stopping the registering mechanism when more than ten subtractions are recorded on any counting dial, said means including a tooth rigid with the counting dial, a lever and a tooth rigid therewith, the teeth being so placed as to engage during the recording of the eleventh subtraction on the above mentioned dial, another lever mounted on a shaft the position of which is shifted when the direction of operation of the registering mechanism is reversed, means operative to connect said lever with the toothed lever above mentioned during the negative operation of the registering mechanism, and to disconnect said levers during positive operation, and means such that a partial rotation of the shiftable lever in its negative position will stop the registering mechanism.

25. In a calculating machine, the combination of registering mechanism including numeral wheels, stop mechanism adapted to stop the operation of the registering mechanism, and a member movable to initiate operation of the registering mechanism and render the stop mechanism responsive to the registration on the numeral wheels.

26. In a calculating machine, the combination of registering mechanism including numeral wheels, stop mechanism adapted to stop the operation of the registering mechanism, a key depressible to initiate operation of the registering mechanism upon depression and to trip the stop mechanism upon release, and another and spring retracted key for initiating operation of the registering mechanism upon depression and means for restraining the stop mechanism from being tripped upon the release of the key.

27. In a calculating machine, the combination of registering mechanism, a plus key, a minus key, a selectively positioned member adapted to be moved into one position by the depression of the plus key and into a second position by the depression of the minus key, stop mechanism for stopping the registering mechanism upon the release of the plus key or the minus key, a divide key, and means whereby the depression of the divide key will render the above mentioned stop mechanism inoperative and move the above mentioned selectively positioned member into the second position mentioned above.

28. In a calculating machine, the combination of registering mechanism including numeral wheels, a member adapted to be selectively positioned for actuating the registering mechanism in either the positive or negative direction, a member movable to institute the process of division, means operative upon the actuation of said last mentioned member for positioning the selectively positioned member in the position for negative operation of the registering mechanism, means operative subsequent to the actuation of said member for repositioning the selectively positioned member to reverse the registering mechanism whenever the remainder on the numeral wheels becomes less than zero, and means simultaneously operative for disconnecting said division instituting member from the selectively positioned member.

29. In a calculating machine, the combination of a shiftable carriage, registering mechanism including numeral wheels, a member movable for instituting negative operation of the registering mechanism, a member adapted to be actuated by a numeral wheel for controlling reversal of the registering mechanism when the remainder on the numeral wheels becomes less than zero, means positioned by the reversal of the registering mechanism for stopping said mechanism and shifting the carriage, and means for returning the above mentioned means to its former position, said last mentioned means including a selectively positioned member for reversibly engaging the registering mechanism and means for positioning same for negative operation upon completion of the carriage shift.

30. In a calculating machine, the combination of registering mechanism, a member adapted to be selectively positioned for reversibly engaging the registering mechanism, stop mechanism adapted to stop the operation of the registering mechanism, counting dials, means for tripping the stop mechanism when any dial reaches a predetermined position with the registering mechanism operating in one direction, and means (actuated by the above mentioned selectively positioned member) for rendering said last mentioned means inoperative with the registering mechanism operating in the opposite direction.

31. In a motor driven calculating machine, numeral wheels, a reversible rotary actuator therefor, a transversely displaceable carriage on which said wheels are mounted, means for displacing the carriage, means for initiating reverse rotation of the actuator, means controlled by the numeral wheels for reversing the direction of rotation of the actuator, means for stopping and locking the actuator at the end of the resultant forward rotation, and means controlled by the actuator for subsequently actuating said displacing means.

32. In a motor driven calculating machine, numeral wheels, a reversible rotary actuator therefor, a transversely displaceable carriage on which said wheels are mounted, manually operable means for initiating reverse rotation of the actuator, means controlled by the numeral wheels for reversing the direction of rotation of the actuator, means for displacing the carriage, means operative as an incident to the first cycle of reversed rotation for controlling said displacing means, and means for stopping and locking the actuator at the end of the first cycle of reversed rotation.

33. In a motor driven calculating machine, reversible numeral wheels, a reversible rotary actuator therefor, a transversely displaceable carriage on which said wheels are mounted, and, means for dividing an amount registered on said wheels by an amount set up in the actuator, including means controlled by a transitional carry of the numeral wheels for reversing the direction of rotation of the actuator, and means for stopping and locking the actuator at the end of the first cycle of reversed rotation, and means controlled by said reversed rotation for subsequently shifting the carriage.

34. In a motor driven calculating machine having reversibly operable registering mechanism, actuating mechanism therefor, a shiftable carriage and motor driven mechanism for shifting said carriage; automatic division mechanism comprising freely retractable means for initiating operation of said actuating mechanism, means controlled by said registering mechanism for completely normalizing said actuating mechanism and initiating operation of said shifting mechanism, and means operated by said shifting mechanism for reinitiating operation of said actuating mechanism.

35. In a motor driven calculating machine, numeral wheels, a transversely displaceable carriage upon which said numeral wheels are mounted, reversible rotary actuating mechanism for said wheels, clutching and reversing power transmission mechanism for reversibly connecting said actuating mechanism to said motor, means comprising an independently operable power transmission mechanism for connecting said carriage to said motor for transverse displacement thereby, and control means for said power transmission mechanisms including devices controlled by said numeral wheels for automatically disconnecting said actuating mechanism from the motor and connecting said carriage to the motor for transverse displacement thereby.

36. In a motor driven calculating machine, numeral wheels, a transversely displaceable carriage upon which said numeral wheels are mouner, reversible rotary actuating mechanism for said wheels, clutching and reversing power transmission mechanism for reversibly connecting said actuating mechanism to said motor, means comprising an independently operable power transmission mechanism for connecting said carriage to said motor for transverse displacement thereby, and control means for said power transmission mechanisms including devices controlled by said numeral wheels for automatically disconnecting said actuating mechanism from the motor, restraining said actuating mechanism from effective movement in either direction, and connecting said carriage to the motor for transverse displacement thereby.

37. In a calculating machine, the combination of registering mechanism, a shiftable carriage, a divide key, means operative upon the depression of the divide key for automatically starting the registering mechanism repeatedly subtracting until the remainder is less than zero, control means immediately operative upon the remainder thus becoming less than zero including a pivotally shiftable member for reversing the direction of rotation of the registering mechanism, means for shifting said pivotally shiftable member so as to reverse the registering mechanism, means automatically operable during the ensuing reverse operation of the registering mechanism for shifting said pivotally shiftable member to arrest the registering mechanism, means for restraining said registering mechanism from effective movement in either direction, and means for shifting the carriage while the registering mechanism is so restrained; and means controlled by said carriage shifting means for subsequently shifting said pivotally shiftable member so as to restart the registering mechanism repeatedly subtracting.

38. In a motor driven calculating machine comprising registering mechanism and power transmission mechanism between said registering mechanism and the motor; the combination with means for controlling said power transmission mechanism to arrest operation of said registering mechanism by the motor, including a spring pressed control member, and a latching element for restraining said member in ineffective position; of a first depressible key, a second depressible key, means controlled by said keys for rendering said power transmission effective to connect said registering mechanism to the motor, means controlled by said first key for releasing said control member from restraint by said latching element and means controlled by said second key for disabling said releasing means.

39. In a calculating machine having reversibly operable numeral wheels, actuating mechanism therefor, and selecting mechanism; means for dividing an amount registered upon said numeral wheels by an amount set up in said selecting mechanism and for automatically registering a quotient, including means controlled by said numeral wheels for reversing the direction of operation thereof by said actuating mechanism; said last named means comprising a member adapted to be tripped to initiate such reversal, a device movable in different directions by said numeral wheels upon movement of said numeral wheels between a "9" and a "0" registration in opposite directions, and means for transmitting movement of said device in one direction only to said member to trip the latter only when the numeral wheels are moving in one preselected direction.

40. In a calculating machine having a transversely shiftable carriage, numeral wheels thereon and differential actuators for said wheels; motor drive means including an actuator driving train, a clutch in said train, an independently operable carriage shifting train, and a clutch in said train, and control means including devices automatically operable to disengage the clutch in said actuator driving train and devices automatically operable to engage the clutch in said carriage shifting train during the time said first mentioned clutch is disengaged; and means brought into operation when the carriage has reached its extreme left position for rendering ineffective the said devices for engaging the clutch in said carriage shifting train.

HAROLD T. AVERY.